US012769331B2

(12) United States Patent
Maeder et al.

(10) Patent No.: US 12,769,331 B2
(45) Date of Patent: Oct. 20, 2026

(54) METHOD FOR CONTROLLING A PATH PLAN OF A VEHICLE WITH TENDERING

(71) Applicant: Deere & Company, Moline, IL (US)

(72) Inventors: Curtis A. Maeder, Johnston, IA (US); Qiang R. Liu, Urbandale, IA (US); Kayla Schulte, Winterset, IA (US); Benjamin R. Dow, Urbandale, IA (US); Aaron Ticknor, Cedar Falls, IA (US); Caroline E. West, Chicago, IL (US); Drew W. Crawford, Fairfield, IA (US)

(73) Assignee: DEERE & COMPANY, Moline, IL (US)

( * ) Notice: Subject to any disclaimer, the term of this patent is extended or adjusted under 35 U.S.C. 154(b) by 104 days.

(21) Appl. No.: 18/747,709

(22) Filed: Jun. 19, 2024

(65) Prior Publication Data

US 2025/0306602 A1 Oct. 2, 2025

Related U.S. Application Data

(60) Provisional application No. 63/570,870, filed on Mar. 28, 2024.

(51) Int. Cl.
*G05D 1/648* (2024.01)
*A01B 69/04* (2006.01)
(Continued)

(52) U.S. Cl.
CPC .......... *G05D 1/648* (2024.01); *A01B 69/008* (2013.01); *A01B 76/00* (2013.01); *G05D 1/86* (2024.01);
(Continued)

(58) Field of Classification Search
CPC ...... G05D 1/648; G05D 1/86; G05D 2105/15; G05D 1/248; G05D 2107/21;
(Continued)

(56) References Cited

U.S. PATENT DOCUMENTS

| | | | |
|---|---|---|---|
| 11,815,894 | B1 | 11/2023 | Ebrahimi Afrouzi et al. |
| 11,914,379 | B2 | 2/2024 | Liu et al. |

(Continued)

FOREIGN PATENT DOCUMENTS

| | | |
|---|---|---|
| JP | 2021108604 A | 8/2021 |

OTHER PUBLICATIONS

Extended European Search Report and Written Opinion issued in European Patent Application No. 25157728.4 dated May 19, 2025, in 08 pages.

*Primary Examiner* — Abdalla A Khaled
(74) *Attorney, Agent, or Firm* — Harness, Dickey & Pierce, P.L.C.

(57) ABSTRACT

A controller is configured to determine that the vehicle requires tendering or service based upon one or more sensors. A wireless device is configured to send wirelessly, via a communications system, an alert message to an end user, who is supervising the vehicle, to confirm end user seeks to select a destination tendering location. Further, the alert message may be sent alone or together with a predefined list of candidate destination tendering locations for the end user to select and to activate the tendering mode. If the end user activates the tendering mode, the controller is configured to record or store in a data storage device a saved first position and corresponding saved first pose of the
(Continued)

vehicle, a saved first implement state and saved first implement settings for any potential return to or resumption of the normal mode after tendering.

20 Claims, 15 Drawing Sheets
(10 of 15 Drawing Sheet(s) Filed in Color)

(51) Int. Cl.

| | |
|---|---|
| ***A01B 76/00*** | (2006.01) |
| ***G05D 1/86*** | (2024.01) |
| ***G07C 5/00*** | (2006.01) |
| *B60L 58/12* | (2019.01) |
| *G05D 105/15* | (2024.01) |

(52) U.S. Cl.
CPC .............. *G07C 5/008* (2013.01); *B60L 58/12* (2019.02); *G05D 2105/15* (2024.01)

(58) Field of Classification Search
CPC .............. G05D 2109/10; G05D 1/2246; A01B 69/008; A01B 76/00; G07C 5/008; B60L 58/12
See application file for complete search history.

(56) References Cited

U.S. PATENT DOCUMENTS

| | | | | |
|---|---|---|---|---|
| 11,920,938 | B2 | 3/2024 | Konrardy et al. | |
| 2016/0091899 | A1 | 3/2016 | Aldred et al. | |
| 2016/0298306 | A1* | 10/2016 | de Kontz | E01C 21/00 |
| 2017/0177002 | A1* | 6/2017 | Ogura | G05D 1/0295 |
| 2019/0178664 | A1* | 6/2019 | Dudar | G01C 22/00 |
| 2021/0039513 | A1* | 2/2021 | Konrardy | B60L 53/36 |
| 2021/0389940 | A1* | 12/2021 | Iwata | B60L 58/12 |
| 2023/0066396 | A1* | 3/2023 | Lee | B60L 8/003 |
| 2023/0302938 | A1* | 9/2023 | Birnthaler | B60L 53/62 |
| 2023/0417020 | A1* | 12/2023 | Harper | B60L 50/60 |
| 2024/0067038 | A1 | 2/2024 | Dowling | |
| 2024/0109449 | A1* | 4/2024 | Lu | B60L 58/12 |
| 2024/0117592 | A1* | 4/2024 | Yoshimoto | E02F 9/20 |
| 2024/0123862 | A1* | 4/2024 | Soderborg | B60L 3/0046 |
| 2024/0270113 | A1* | 8/2024 | Anand | B60L 53/65 |
| 2024/0284819 | A1* | 8/2024 | Sauder | A01G 25/09 |
| 2025/0083691 | A1* | 3/2025 | Stumpf | B60W 60/001 |
| 2025/0207356 | A1* | 6/2025 | Krone | E02F 3/7604 |
| 2025/0249781 | A1* | 8/2025 | Yang | B60L 58/12 |
| 2025/0290769 | A1* | 9/2025 | Hourunranta | B60L 53/63 |

* cited by examiner

METHOD FOR CONTROLLING A PATH PLAN OF A VEHICLE WITH TENDERING

RELATED APPLICATION

This document (including the drawings) claims priority and the benefit of the filing date based on U.S. provisional application No. 63/570,870, filed Mar. 28, 2024, under 35 U.S.C. § 119(e), where the provisional application is hereby incorporated by reference herein.

FIELD

This disclosure relates to a method for controlling a path plan of the vehicle with tendering.

BACKGROUND

In certain prior art, remote-controlled vehicles, semi-autonomous vehicles, or autonomous vehicles can be configured to return to a base station for battery charging; after the battery is fully charged, the vehicle may continue operating or may revert to an rest mode. However, the work that the vehicle was preforming prior to the return to the base station can be disrupted in a manner in which prior work is duplicated. Accordingly, there is a need for an improved method for controlling a path plan of the vehicle with tendering.

SUMMARY

In accordance with one aspect of the disclosure, a method for controlling a path plan of a vehicle comprises, in a normal mode, a controller or electronic data processor configured to operate the vehicle (e.g., an autonomous vehicle, a semi-autonomous vehicle, or remote controlled vehicle) along a current row of a path of the vehicle, where the vehicle has a first pose (e.g., heading or yaw angle). The controller or sensor interface is configured to determine that the vehicle requires tendering or service based upon one or more sensors, wherein the sensors comprise a fuel sensor indicating that the fuel level of the vehicle is below a lower threshold fuel level or a battery state of charge sensor indicating that the state of charge of the battery is below a lower threshold charge level. A wireless device is configured to send wirelessly, via a communications system, an alert message to an end user, who is supervising the vehicle, to confirm end user seeks to select a destination tendering location. Further, the alert message may be sent alone or together with a predefined list of candidate destination tendering locations for the end user to select and to activate the tendering mode. If the end user activates the tendering mode, the controller is configured to record or store in a data storage device (e.g., a primary data storage device or a secondary data storage device) a saved first position and corresponding saved first pose of the vehicle, a saved first implement state and saved first implement settings for any potential return to or resumption of the normal mode after tendering.

In accordance with another aspect of the disclosure, via a remote user interface and wireless communications, an operator can remotely summon a vehicle (e.g., autonomous or semi-autonomous vehicle): (a) to a designated tendering location (e.g., station) for service or refilling, and (b) to subsequently return to the field and resume normal operations or a previous work task.

In accordance with another aspect of the disclosure, while operating in a field, at work site or in an off-road environment in a normal mode, the vehicular system is configured to respond to remote requests for traveling to and stopping at a selected tendering station. A planner module is configured to plan a path to the destination tendering location or tendering station; a guidance module is configured to support guidance and navigating with speed control, and managing implement operations during the transition off and on a field portion (e.g., interior edge), a field or worksite, such as before and after stopping at the tendering location or tendering station.

BRIEF DESCRIPTION OF THE DRAWINGS

The patent or application file contains a least one drawing executed in color. Copies of this patent or patent application publication with color drawing(s) will be provided by the Office upon request and payment of the necessary fee.

Like reference numbers in any set of two or more drawings indicates like features, methods or elements.

DETAILED DISCLOSURE

Figure 1:
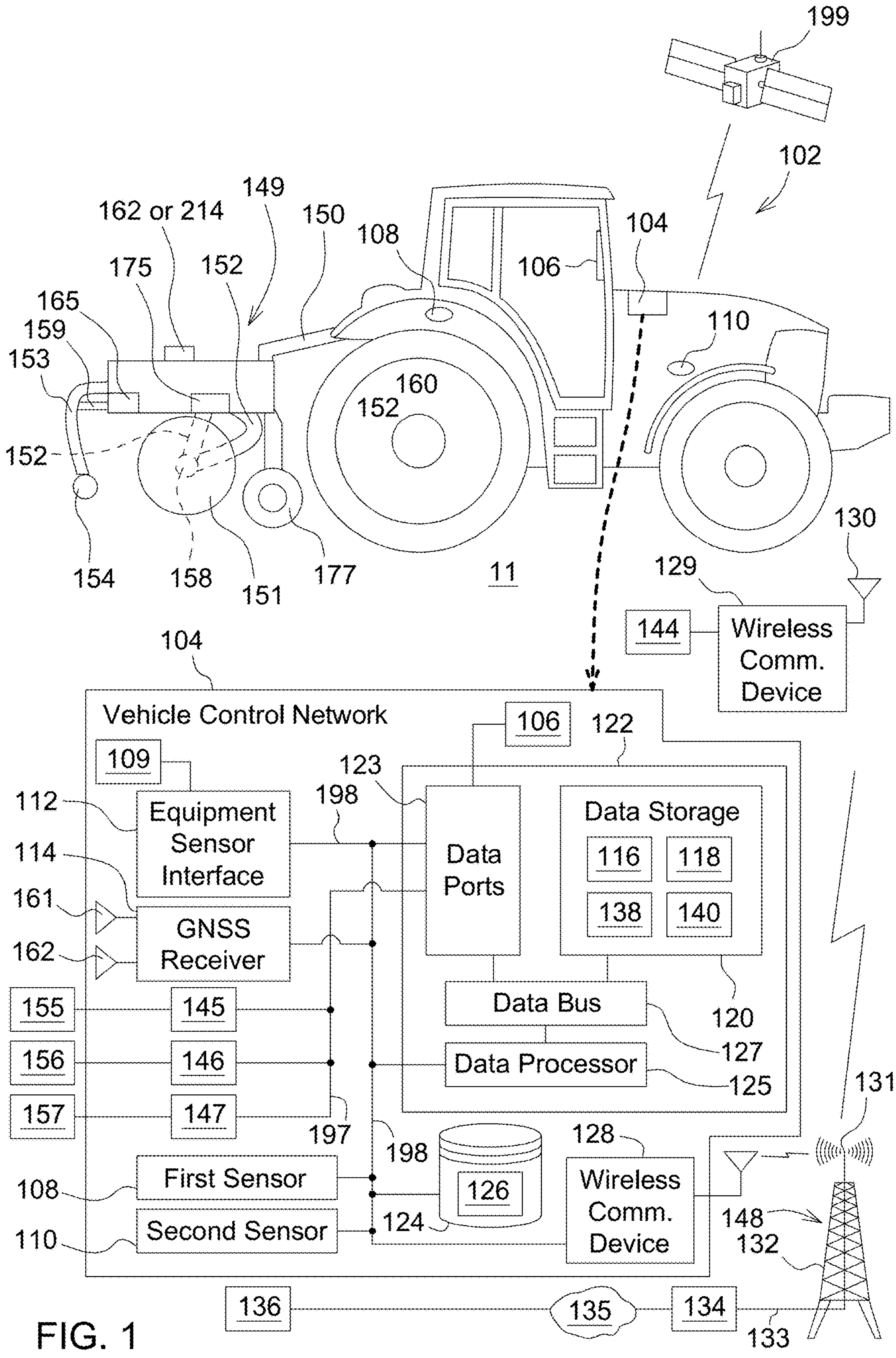
FIG. 1 is a block diagram one embodiment of a system for controlling a path plan of the vehicle with tendering in accordance with the disclosure.

In any of the above referenced drawings of this document, any arrow or line that connects any blocks, components, modules, multiplexers, memory, data storage, accumulators, data processors, electronic components, sensors, accelerometer, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system or method in which one or more data processors process, store, retrieve, and otherwise manipulate data via data buses and one or more data storage devices (e.g., accumulators or memory) as described in this document and the accompanying drawings. As used in this document, "configured to, adapted to, or arranged to" mean that the data processor or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIG. 1 and FIG. 2 and/or any other drawing in this disclosure. Alternately, separately from or cumulatively with the above definition, "configured to, adapted to, or arranged to" can mean that the method or system comprises one or more components described herein as software modules, equivalent electronic hardware modules, or both to execute any referenced functions, mathematical operations, calculations, determinations, processes, methods, algorithms, subroutine.

Precise point positioning (PPP) means the use of precise satellite orbit and clock corrections provided wirelessly via correction data, rather than normal satellite broadcast information (ephemeris data) that is encoded on the received satellite signals, to determine a relative position or absolute position of a mobile user satellite navigation receiver. PPP uses correction data that is applicable to a wide geographic area or based on a network of reference satellite receiver stations via a correction wireless device. PPP may be used without one or more local reference satellite receiver stations to provide local differential corrections (e.g., real time kinematic or RTK corrections) to the mobile receiver via a correction wireless device.

An autonomous vehicle may comprise a vehicle without a cab or a cockpit, a vehicle without an operator in a cab or cockpit of the vehicle, or a vehicle that is capable of operating with a remote operator who supervises or manages the vehicle, its implement(s), or both.

A semi-autonomous vehicle may comprise a vehicle with an operator in cab or cockpit of the vehicle, where the vehicle is capable of operating with a remote operator who supervises or manages the vehicle, its implement(s), or both.

A remote-controlled vehicle is an operator that is controlled remotely via a first wireless communications device 129 (with antenna 130) that communicates, directly or indirectly with a second wireless communications device 128 on the vehicle (e.g., 102), where indirect communications may occur via a repeater, a satellite (e.g., satellite repeater or any combination/network of satellite communications transmitter(s), receiver(s) or transceiver(s)), or wireless network.

Precise positioning refers to precise point positioning (PPP) or similar forms of providing accurate position estimates based on differential correction data or correction data such as precise clock corrections, orbit corrections, and satellite bias information. Precise point positioning (PPP) means: (1) use precise satellite orbit corrections, precise clock corrections, and satellite bias information, rather than normal satellite broadcast information (ephemeris data), to determine a relative position or absolute position of a mobile user satellite navigation receiver without any local reference satellite stations to provide differential correction, or (2) use precise satellite orbit corrections, precise clock corrections, and satellite bias information; ordinary broadcast information (ephemeris data) and with differential correction data, measured range data, or carrier phase data from one or more local reference stations.

PPP may use correction data that is applicable to a wide geographic area. The typical PPP includes a network of multiple reference stations in communication with a computational center or hub. The computational center determines precise correction data based upon the known locations of the reference stations and the carrier phase measurements taken by them. The computed correction data are then transmitted to users via a communication link such as satellite, phone, or radio. By using multiple reference stations, PPP provides more accurate estimates of the precise correction data.

Repeatability is the ability of a GNSS receiver 114 or GNSS guidance system to bring the user, vehicle (e.g., 102) or its implement back to the same spot within certain accuracy in the field reliably each time. This is critical for precision farming applications such as automated steering, automated guidance, navigation, autonomous guidance, and boundary mapping. PPP or a receiver operating in the PPP mode may provide in-season repeatability of positions with precision of up to plus or minus 1.2 inches (or approximately 3.048 centimeters) pass-to-pass accuracy, subject to the availability of the correction signal via a wireless communications device or satellite receiver. In one embodiment, the PPP mode relies upon a correction signal that incorporates precise satellite and precise orbit corrections for one or more GNSS constellations, which can be used to provide globally valid correction signals. A rover or mobile receiver processes the correction signal to estimate positions or solutions based on carrier phase estimations of received GNSS signals from one or more constellations.

In some applications and throughout this document, wide-area differential GNSS correction mode (DGNSS), such as differential Global Positioning System (DGPS), may be used as an alternative to PPP mode, although DGPS (mode) tends to provide less accurate or precise position estimates and less repeatable position estimates than certain PPP (mode) configurations.

Differential operations using carrier-phase measurements are often referred to as real-time kinematic (RTK) positioning/navigation operations. The fundamental concept of Differential GNSS (DGNSS) is to take advantage of the spatial and temporal correlations of the errors inherent in the GNSS measurements. For short baseline or separation between the mobile receiver and the reference receiver, the mobile receiver can use the correction data to cancel or significantly mitigate most of the error sources in the pseudo-range and/or carrier phase measurements, such as GNSS orbit error, ionospheric delay, and tropospheric delay.

The pose refers to one or more of the following: attitude, tilt angle, roll angle, yaw angle (e.g., heading angle), where the pose or attitude may be associated with a respective vehicle, a respective implement, or both. For example, the vehicle pose or vehicle attitude may be independent of (or sometimes correlated to) the implement pose or implement attitude, depending upon the slope of the terrain or ground upon which the vehicle or implement sits within a given cell or zone of the terrain, ground, field or worksite.

An implement position (e.g., reference position on the implement) may have an offset in two or three dimensions with respect to the vehicle position that tows, pulls or moves the implement, such as a planter, sprayer, tillage, or other operation.

Inertial measurement unit (IMU) means one or more inertial sensors (e.g., accelerometers) that provide position, attitude, velocity, accelerator or motion measurements, where the IMU may be calibrated or initialized by settings, observations from a location-determining receiver, such as a global navigation satellite system (GNSS) receiver.

A multi-axis accelerometer is a device that measures motion or acceleration applied to it, which can be used to determine or estimate attitude, pose, or pitch angle, roll angle, and yaw angle, or pitch acceleration, roll acceleration or yaw acceleration.

In FIG. 1, although the vehicle 102 is shown with a cab or a cockpit, some embodiments of the vehicle 102 may omit the cab or the cockpit, where the vehicle 102 comprises an unmanned, autonomous, remote-controlled or semi-autonomous vehicle. As shown, the vehicle 102 has a hitch (e.g., three-point hitch) that is mechanically coupled to an implement 149, such as a tillage implement. The implement 149 has a frame 175 that is coupled to the hitch 150. In turn, a support 160 or strut extends downward from the frame 175 to support a rotatable wheel 177 that is rotatable with respect to the support 160. The frame 175 also has one or more ground-engaging members (151,154) for tilling, cultivating, aerating, pulverizing, breaking up clods or clumps, mixing, stirring, or manipulating the soil. For example, the ground-engaging members may comprise one or more discs or rotatable discs 151 (e.g., disc harrow) are supported by one or more braces 152 or members that extend downward from the frame 175, where in certain configurations can rotate about shaft 158. Similarly, the ground-engaging members may comprise a set of cutters, chisels, knives, rollers, (rotatable) roller cage 154, or trailing cultivating members, where an actuator 159 is coupled between a rotatable arms 153 (e.g., trailing arm) and the frame 175 to apply a down-force to the ground-engaging member (154), to apply depth control to the ground-engaging member (154), or to pivotable adjust the ground-engaging member (154). The actuator 159 may comprise an electrohydraulic actuator or cylinder or a linear actuator. In practice, the actuator 159 can be coupled to the vehicle control network 104 via a transmission line, a multiconductor cable, a twisted pair cable or data bus to the data ports 123 to accept commands from the electronic data processor 125.

In an alternate embodiment, the combination of the trailing arms 153 and roller cage 154 may be replaced by a set of knives, cutters or chisels that are coupled to a generally horizontal (draft) bar and that shaped somewhat similar to the profile of the trailing arms 153, where the bar is coupled or connected to the frame 175.

In the example illustrated in FIG. 1, the first sensor 108 is located near the rear end of the vehicle 102. The first sensor 108 may comprise any of the following: an IMU, a multi-axis accelerometer, a motion sensor, or a velocity sensor. The first sensor 108 is configured to determine the pose, attitude, acceleration, velocity (e.g., speed and direction) of the vehicle 102. The first sensor 108 communicates over a vehicle data bus 198 with vehicle control network 104 to provide data representative of the motion or attitude of the vehicle 102. In other examples disclosed herein, the first sensor 108 may be located in and/or on any suitable section of the vehicle 102 (e.g., the front of the vehicle 102, the roof of the vehicle 102).

In the example illustrated in FIG. 1, the second sensor 110 is located near the front end of the vehicle 102 and may be associated with the steering assembly or steering system 155 of the vehicle 102. The second sensor 110 comprises wheel direction sensor that senses the position and/or angle in which a wheel of the vehicle 102 (e.g., a rear wheel and/or a front wheel) is placed. The second sensor 110 communicates with the vehicle control network 104 via a vehicle data bus 198 to provide data representative of the position, yaw angle or heading angle of a wheel of the vehicle 102.

The GNSS receiver 114 may provide position, attitude and motion data to supplement or replace the first sensor 108, the second sensor 110 or both. For example, the GNSS receiver 114 can provide the position of the vehicle 102, an attitude of the vehicle 102, such as the vehicle heading or yaw angle, and the velocity of the vehicle (e.g., 102), and the acceleration of the vehicle (e.g., 102) in two or three dimensions. The GNSS receiver 114 is coupled to the vehicle data bus 198 or directly to the controller 122.

In one embodiment, a third sensor 109 may comprise any suitable sensor on the vehicle 102 such a fuel level sensor of fuel in an onboard tank of the vehicle (e.g., for a vehicle with a propulsion system 157 that has an internal combustion engine), or a battery state-of-charge sensor that estimates the state of charge of the battery or energy storage system of the vehicle (e.g., for a vehicle with a propulsion system 157 or implement system that uses an electric motor).

In an alternate embodiment, a supplemental sensor comprises any of the following sensor devices: proximity sensor, an odometer, wheel rotation sensor (e.g., revolution per minute (RPM) sensor), a dead-reckoning navigation device, a Light Detection and Ranging (LIDAR) sensor, an imaging device, an ultrasonic ranging device, a camera, a stereo imaging device, or the like that supplement the first sensor 108, the second sensor 110 or the Global Navigation Satellite System (GNSS) receiver 114.

In FIG. 1, the first sensor 108, the second sensor 110, the third sensor the GNSS are capable of communicating with the equipment sensor interface 112 via the vehicle data bus 198. The equipment sensor interface 112 can process the observed sensor data (from one or more of the sensors, 108, 109, 110) and fuse the observed sensor data to yield aggregate or averaged position data, motion data, attitude data, and steering angle data of one or more of the wheels of the vehicle 102.

As illustrated in FIG. 1, the GNSS receiver 114 is coupled to the vehicle data bus 198. Alternatively or cumulatively, the GNSS receiver 114 may be coupled to the controller 122 directly. The GNSS receiver 114 comprises any location-determining receiver, such as GNSS receiver 114 that supports RTK (e.g., RTK mode), PPP (PPP mode), or other carrier-phase differential positioning solutions that support in-season repeatability sufficient for the vehicle (e.g., 102) and equipment to resume operations after tendering. The GNSS receiver 114 requires a correction communications device, which may comprise a wireless receiver or a transceiver for receiving correction data from a correction data service. In some embodiments, the second wireless communications device 128 may be capable of receiving correction data from a correction data services, such as a satellite correction signal, a wireless correction signal, or a cellular correction signal.

In one embodiment, the GNSS receiver 114 is configured to estimate or determine its geographical position in coordinates of the GNSS receiver 114 on the vehicle 102, such as the geographic coordinates of the first antenna 161 on the vehicle 102 or second antenna 162 on the implement 149. The GNSS receiver 114 may have a first antenna 161 mounted on the vehicle (e.g., 102) and a second antenna 162 mounted on the implement, where the GNSS receiver 114 has a selectable switch to switch between satellite signals on a transmission line 133 from the first antenna 161 or the second antenna 162. Accordingly, the GNSS receiver 114 may estimate the vehicular position, vehicular pose (e.g., vehicular attitude or vehicular heading), and vehicle motion data and the implement position, implement pose (e.g., implement attitude or implement heading) and implement motion data.

In an alternate embodiment, two separate GNSS receivers 114 may be used, a first GNSS receiver 114 (along with its first antenna 161) may be mounted on the vehicle (e.g., 102) and a second GNSS receiver 214 (along with its second antenna) may be mounted on the implement. Accordingly, the first GNSS receiver 114 may estimate the vehicle position, vehicle attitude (e.g., vehicle heading), and vehicle motion data and the second GNSS receiver 114 may estimate the implement position, implement pose (e.g., implement attitude or implement heading) and implement motion data.

In examples disclosed herein, the GNSS receiver 114 samples the geographical location of the vehicle 102 at a threshold interval. In some examples, the GNSS receiver 114 receives geographical location data from other vehicles in the field (e.g., vehicles different from the example vehicle 102). For example, the GNSS receiver 114 may connect to a shared network for the field that the vehicle 102 is operating in, and the shared network may obtain coverage data and path data from other machines/vehicles in the network.

The electronic data processor 125 implements algorithms, executes software instructions, and/or performs other logic or functionality of the display system described in further detail below. The electronic data processor 125 may be any type of processor configured to execute program codes such as those stored in the data storage device (120, 124). In an example embodiment, the electronic data processor 125 may include an electronic data processor, a digital signal processor, microprocessor, a microcontroller, a programmable logic array (PLA), field programmable gate array (FPGA), a system on a chip (SOC), a logic circuit, an arithmetic logic unit, an application specific integrated circuit (ASIC), a digital signal processor (DSP), system on a chip, a proportional-integral-derivative (PID) controller, or another data processing device.

The data storage device (120, 124) may include any magnetic, electronic, or optical device for storing data. For example, the data storage device (120, 124) may include an electronic data storage device, an electronic memory, non-volatile electronic random access memory, one or more electronic data registers, data latches, a magnetic disc drive, a hard disc drive, a solid-state storage drive, an optical disc drive, or the like. The electronic data processor 125 outputs results of software instructions, which may encompass algorithms and other functionality of the system 11, to the data bus 127.

The electronic data processor 125 is configured to execute software instructions, software or a program that is storable or capable of being stored in the data storage device (120, 124). In one embodiment, data storage device 120, may store software modules, such as a path planning module 116, a guidance module 118, a mode selection module 117, an autonomy control module 138, a tendering/resumption management module 140, where any modules may support sensors, actuators, and controllers and electronic data processors on the vehicle, the implement, or both. In another embodiment, the data storage device 124 may store position data, pose data (e.g., heading angle or yaw angle), attitude data (e.g., pitch angle, roll angle or yaw angle; or velocity or acceleration of pitch, roll and yaw) and steering angle data for the vehicle, the implement, or both, such as first vehicular position, second vehicular position, first vehicular pose, second vehicular pose, first implement position, second implement position, first implement pose, and second implement pose.

In one embodiment, the path planning module 116 is configured to support, manage, prepare, select, or execute one or more path plans of the vehicle 102, the implement 149, or both the vehicle 102 and implement 149 in accordance with operator input from the remote user interface 144, a local user interface 106 (if present in the vehicle), and/or (autonomous or semi-autonomous) commands or input from the autonomy control module 138. The guidance module 118 is configured to provide command data to a steering controller 145, a braking controller 146 or a propulsion controller 147 to track or follow a planned path or path plan based on observed position data and observed pose/attitude data (of the vehicle 102, implement 149, or both) from the GNSS receiver 114 or GNSS receivers (114,

214), unless a deviation is required by the operator input or by an autonomy control module 138 (e.g., obstacle avoidance module). For example, the guidance module 118 is configured to provide: (a) steering command data to the steering controller 145, (b) braking command data to the braking controller 146, and/or (c) propulsion command data (e.g., commanded torque or commanded speed) to the propulsion controller 147. As illustrated, the steering controller 145, the braking controller 146, and the propulsion controller 147 may be coupled to the controller 122 via dedicated vehicle data bus 198, such as a transmission line, multiconductor cable, fiber optic line, coaxial cable, twisted pairs, Ethernet communications link, or the like.

The mode selection module 117 is configured to allow selection between a normal mode, a tendering mode or a resumption mode, where the above modes are generally mutually exclusive such that the vehicle 102 can only operate in single mode at one time.

The autonomy control module 138 (e.g., semi-autonomous or autonomous control module) may have: (1) an obstacle avoidance system to detect and avoid obstacles around the vehicle, such as avoiding, evading or changing the path of the vehicle based on data from one or more sensors (108, 109, 110) that observe the environment around the vehicle; (2) a navigation system to allow the vehicle (e.g., 102) to respond to sensors (108, 109, 110) that observe the environment around the vehicle; and (3) mission control system that provides supervision, management or direction for the vehicle and system 11 to fulfill a mission or set of one or more work tasks. In some embodiments, the autonomy control module 138 can accept operator commands for work tasks, path plans, or go-to location requests based on operator input from a remote user interface 144 or a local user interface 106 (if present). For example, via the remote user interface 144 and the first wireless device 129, a remote operator can communicate wirelessly to the second wireless communication device 128 and the vehicle control network 104 (e.g., vehicle electronics) on the vehicle 102, where the wireless communications can be supported via one or more satellites (e.g., satellite system 199) or via wireless communications system 148, which may further comprise a wireless (radio) base station 134, a tower 132 or monopole, an antenna 131, and transmission line 133. Alternately, via the local user interface 106 and the data ports 123, a local operator, who is located in a cab (if present) or cockpit (if present) of the vehicle (e.g., 102), can communicate directly and locally to the vehicle control network 104.

The tendering/resumption management module 140 is configured to provide software instructions suitable for entering the tendering mode, preparing for tendering, exiting the tendering mode, and preparing for resumption of operating the vehicle 102 in a normal mode, as explained in this disclosure.

In one embodiment, the steering controller 145 is coupled to a steering system 155 (e.g., steering actuator) for controlling an angle or position of the wheels to steer the vehicle 102, or the implement or both. The steering system 155 may comprise a steering actuator, such as an electrohydraulic steering device, an electric motor, or a linear actuator that is coupled to rack-and-pinion steering system, an Ackerman steering system, or the like to direct or control the angle of the wheels with respect to the vehicle or the angle of the wheels with respect to the implement.

In one embodiment, the braking controller 146 is coupled to a braking system 156, which may comprise an electrohydraulic braking system, an electromagnetic braking system, or electromechanical braking actuator to slow, decelerate or stop the vehicle 102, the implement, or both. The braking system 156 may comprise an actuator that presses a piston or friction pad against a rotor disc, drum or rotor hub to apply a mechanical force that slows or stops the rotation of one or more ground-engaging wheels or tracks of the vehicle.

The propulsion controller 147 comprises to an inverter to control an electric drive system or a fuel metering device to control the amount of fuel that is provided to an internal combustion engine, where the electric drive system or the internal combustion engine has a rotatable shaft that is coupled, directly or indirectly to one or more ground-engaging tracks or wheels, through one or more of the following: gearbox, clutch, differential, transaxle, or transmission.

A (second) wireless communications device 128, the data ports 123, the data storage device 120, the local user interface 106, the data bus 127, the electronic data processor 125 are connected or coupled to the data bus 127 and are configured to communicate with each other through the data bus 127. For example, local user interface 106 comprises an electronic display with keypad or keyboard, or touchscreen electronic display. Meanwhile, data ports 123, the equipment sensor interface 112, one or more GNSS receivers (114, 214), the first sensor 108, the second sensor 110, and the third sensor 109, the secondary data storage device 124, and the (second) wireless communications device 12 are coupled to one or more vehicle data buses 197 to the support communications of data messages (e.g., Controller Area Network, CAN) or data packets (e.g., Ethernet data packets) between the foregoing ports, interface, receivers, sensors, devices, components or modules of the vehicle control network 104.

The first wireless communications device 129 (e.g., remote wireless communications device) is located within wireless communications range of the second wireless communications device 128 or within wireless communications device of a repeater or wireless communications system 148, such as cell site of a wireless communications system 148. The cell site or wireless communications system 148 may comprise a base station 134 that is coupled to an electronic communications network 135 (e.g., Internet or a private network, or fiber optic packet communications network). In turn, a central server 136 can communicate with the base station 134 via the electronic communications network 135. The cell site or wireless communications system 48 may further comprise transmission line 133 and an antenna 131 that is mounted on a tower 132, monopole, or other structure to provide support the repeating of communications or establishing one or more communication channels between the first wireless communications device 129 remote from the vehicle 102 and a second communications on the vehicle 102.

In one embodiment, an operator or remote operator has a remote user interface 144 that is associated with (e.g., integral with or coupled to) the first wireless communications device 129. The remote user interface 144 or the local user interface 106 may comprise one or more of the following: an electronic display, a touchscreen display, a keypad, a keyboard, a pointing device (e.g., electronic mouse), a switch or a control panel for inputting or outputting command data instructions, status, diagnostics or control data between the first wireless communications device 129 and the second wireless communications device 128 on or at the vehicle 102. For example, the remote user interface 144, via the first wireless communications device 129 (e.g., remote wireless communications device) transmits and receives data regarding the vehicle 102 through the second wireless communication device 128 (e.g., vehicle wireless communications device) on the vehicle 102, such as one or more of the illustrative screens of FIG. 6 through FIG. 17, inclusive.

The second wireless communications device 128 is connected to the vehicle data bus (198, 197) to support communication with one or more data ports 123 of the controller 122. In addition to the second wireless communications device 128, if the vehicle 102 has cockpit or cab, a local user interface 106 may be available for an operator who is at the vehicle 102.

In one embodiment, the path plan represents a series of linear path segments, curved path segments, contour path segments, or other path segments that are connected or joined end to end. For example, some linear path segments or contour path segments make track a generally parallel path to the edge or side of field or work area. Further, linear path segments may be started with reference to two points (e.g., point A and point B spaced apart from point A) that are selected by an operator, via a local user interface 106 in the cab of the vehicle 102, or via a remote user interface 144 co-located or within the first wireless communications device 129. The operator selects the foregoing points to form an A-B line segment, where the first point is identified as waypoint A and the second point is identified as waypoint B, and where each waypoint or point can be associated with corresponding geographic coordinates in two or three dimensions. The path plan may have row segments (e.g., swaths or path segments) that are interconnected by end turns, such as key-hole turns or approximately one-hundred and eighty degree turns that can be executed within the headland area of a field or work site. Approximately shall mean within a tolerance of plus or minus ten percent of any value, angle, or amount, unless otherwise specified. In a path plan or planned path, the rows are generally spaced apart by an implement width of the implement or the vehicle 102, less any overlap between adjacent rows that is permitted or desirable to accomplish a certain work task, agricultural work task in which there is some overlap in spraying or tillage to avoid gaps in coverage, for example. The secondary data storage device 124 may store planned paths or path plans for query, storage, retrieval or access (e.g., read or write access) by the path planning module 116.

In the normal mode if the vehicle 102 is operating in autonomously, the guidance module 118 may follow a path plan in which the vehicle 102 follows a current path plan until a tendering alert is generated by the operator or generated by the tendering/resumption management module 140. One or more GNSS receivers (114, 214) provides the then-current position of the vehicle (e.g., 102) and/or the implement 149, such that the vehicle (e.g., 102), the implement 149 or both can track the path plan (e.g., with minimal lateral error or other tracking error).

In examples disclosed herein, the path plan generally includes boundaries of the field, such that end turns can be located within a headland that is still within the boundaries of the field, where the turning radius of the vehicle 102 and implement will impact the interior boundary (or interior edge) between the headland the main portion of the field or worksite. In one configuration, boundaries of the field may be determined by a prior survey in which a vehicle 102 with a GNSS receiver (e.g., 114) traversed the boundary to collect and record a series of points or way points that define and intercept the boundaries of the field.

In one embodiment, a method or system for controlling a path plan of a vehicle comprises a controller 122 or electronic data processor 125 that is configured to operate in a normal mode in which the vehicle is automatically guided, such as an autonomous vehicle, a semi-autonomous vehicle, or remote controlled vehicle, along a current row of a path of the vehicle 102, where the vehicle 102 has a first pose (e.g., heading angle or yaw angle). The steering angle is generally correlated to the heading angle or yaw angle and tends to be aligned with the heading or yaw angle within an angular range, where guidance module 118, alone or together with the GNSS receiver (114, 214) can direct the steering system 155 via the steering control to adjust the steering angle (and/or a steering gain or change of the steering angle with respect to time) such that: (a) the vehicle 102 follows or tracks a target guidance line, a curved segment of a path plan, or a generally linear section of a path plan (e.g., vehicle path plan) or (b) the implement 149 that is towed or moved by the vehicle 102 follows or tracks a target guidance line, a curved segment of a path plan, or a generally linear section of a path plan (e.g., implement path plan). One or more GNSS receivers (114, 214) provide position data, or position and heading data to facilitate the vehicle (e.g., 102) or its implement tracking a target path plan, which may be stored in the data storage device (120, 124).

The controller 122 or electronic data processor 125 is configured to determine that the vehicle 102 requires tendering or service based upon one or more sensors (108, 109, 110), wherein the sensors 109 comprise a fuel sensor indicating that the fuel level of the vehicle 102 is below a lower threshold fuel level or a battery state of charge sensor indicating that the state-of-charge of the battery is below a lower threshold charge level. For example, the fuel sensor is used if the vehicle 102 comprises an internal combustion engine, and the battery-state-of-charge sensor is used if the vehicle 102 comprises an electric motor, such as an electric drive motor for the propulsion system 157 in an electric vehicle, or a hybrid electric vehicle as the vehicle 102.

In one embodiment, the electronic data processor 125 or controller 122 is configured to send wirelessly an alert message to: (a) a remote user interface 144 via a second wireless communications device 128, or via the first wireless communications device 129 and a wireless communications network 148 or satellite system 199, or (b) a local user interface 106 within the cockpit (if available) or cab (if available) of the vehicle 102. An operator, such as a remote operator or remote end user, who is supervising the vehicle 102, can confirm or authorize a tendering process (e.g., to refuel, recharge or otherwise service the vehicle 102 or implement 149) or seeks to select a destination tendering location and authorize the tendering process. Further, the second wireless communications device 128 and the electronic data processor 125 are configured to send wirelessly a predefined list of candidate destination tendering locations for the end user or remote operator: to select, or to activate the tendering mode, or both to select and activate the tendering mode.

The preparation for the tendering mode or the preparation for the tendering and resumption mode may be executed in accordance with various examples, that the controller 122 and electronic data processor 125 may apply separately or cumulatively with one another.

In a first example, if the end user or operator authorizes or activates the tendering mode while operating in the normal mode in the field or worksite, the electronic data processor 125 or the controller 122 are configured to record or store in a data storage device (120, 124) one or more of the following: (a) a first vehicular position and corresponding first vehicular pose (e.g., first vehicular heading angle or first yaw angle or first attitude) of the vehicle 102, or (b) a first implement position and corresponding first implement pose (e.g., first implement heading angle or first yaw angle or first implement attitude) of the implement 149. Further, via the remote user interface 144 the remote operator may authorize or activate the tendering mode by selecting a destination tendering location that is transmitted back to the vehicle control network 104 or vehicle electronics through the wireless communications path or channel via wireless communications network 148 or a satellite system 199, where either the wireless communications network 148 or the satellite system 199 may function alone, or together with an electronic communications network 135 (e.g., Internet).

In a second example, if the end user or operator authorizes or activates the tendering mode while operating in the normal mode in the field or worksite, the electronic data processor 125 or the controller 122 are configured to record or store in a data storage device (120, 124) one or more of the following: (a) a first vehicular position and corresponding first vehicular pose (e.g., first vehicular heading angle or first yaw angle or first attitude) of the vehicle 102, (b) a first implement position and corresponding first implement pose (e.g., first implement heading angle or first yaw angle or first implement attitude) of the implement 149, (c) first vehicular steering angle or change in the first vehicle steering angle with respect to time, or (d) first implement steering angle (e.g., if the implement is steerable) or first implement steering angle with respect to time. Further, via the remote user interface 144 the remote operator may authorize or activate the tendering mode by selecting a destination tendering location that is transmitted back to the vehicle control network 104 or vehicle electronics through the wireless communications path or channel via wireless communications network 148 or a satellite system 199, where either the wireless communications network 148 or the satellite system 199 may function alone, or together with an electronic communications network 135 (e.g., Internet).

In a third example, if the end user or operator authorizes or activates the tendering mode while operating in the field or the worksite, the electronic data processor 125 or the controller 122 are configured to record or store in a data storage device (120, 124) one or more of the following: (a) a first vehicular position and corresponding first vehicular pose (e.g., first vehicular heading angle or first yaw angle or first attitude) of the vehicle 102, (b) a first implement position and corresponding first implement pose (e.g., first implement heading angle or first yaw angle or first implement attitude) of the implement, (c) first vehicular steering angle or change in the first vehicle steering angle with respect to time, or (d) first implement steering angle (e.g., if the implement is steerable) or first implement steering angle with respect to time, (e) for a respective implement position a first implement state and first implement settings for any potential return to or resumption of the normal mode after tendering, or (f) for a respective vehicle position (with a predetermined offset or equation-based offset to the implement position) a first implement state and first implement settings for any potential return to or resumption of the normal mode after tendering. For example, the tendering/resumption management module 140 is configured to provide software instructions for the electronic data processor 125 to record or store in a data storage device (120, 124) a saved first position and corresponding saved first pose of the vehicle 102, a saved first implement state and saved first implement settings for any potential return to or resumption of the normal mode after tendering. The electronic data processor 125 or controller 122 will record the position and corresponding pose or attitude (e.g., heading angle, or yaw angle) of the vehicle state and the implement state and implement settings at or immediately prior to request to tender. Further, via the remote user interface 144 the remote operator may authorize or activate the tendering mode by selecting a destination tendering location that is transmitted back to the vehicle control network 104 or vehicle electronics through the wireless communications path or channel via wireless communications network 148 or a satellite system 199, where either the wireless communications network 148 or the satellite system 199 may function alone, or together with an electronic communications network 135 (e.g., Internet).

In a fourth example, the guidance module 118 and path planning module 116 support storage of the position of destination tendering location or destination tendering station or a zone or area of the destination tendering location or destination tendering station, where the zone or area is defined by a set of boundary or border points (e.g., geographic coordinates). Further, on approach to and at the destination tendering location, or within the tendering zone, or within the tendering areas, the electronic data processor 125 can retrieve the following from the data storage device (120, 124): one or more of the following: (a) a second vehicular position and corresponding first vehicular pose (e.g., second vehicular heading angle or second yaw angle or second attitude) of the vehicle 102, (b) a second implement position and corresponding second implement pose (e.g., second implement heading angle or first yaw angle or second implement attitude) of the implement 149, (c) second vehicular steering angle or change in the second vehicle steering angle with respect to time, or (d) second implement steering angle (e.g., if the implement is steerable) or second implement steering angle with respect to time.

In conjunction with the fourth example in some embodiments, the second vehicular position and corresponding second vehicular pose (e.g., second heading angle, second yaw angle, or second attitude) may be selected such that a fuel port on the vehicle 102 is spaced apart from a fuel pump or refueling station by a target separation and angular range. In certain embodiments, the second vehicular position and corresponding second vehicular pose may be selected such that a recharging port (e.g., battery recharging port) on the vehicle 102 is spaced apart from a battery charging station by a target separation and angular range. In other embodiments, the second vehicular position and corresponding second vehicular pose may be selected such that a battery zone on the vehicle 102 is spaced apart from a battery replacement station by a target separation and angular range to support battery removal, replacement or swapping. In still other embodiments, the second vehicular position and corresponding second vehicle pose may be selected such that the vehicle 102 is spaced apart from service bay by a target separation and angular range, or located within a service bay region, such as within a building, or on a generally level area, a concrete slab, a paved area, or gravel area for servicing, refueling or recharging the vehicle 102, or its implement. Consistent with the above description, the first vehicular position is associated with a first position (e.g., geographic coordinates in two or three dimensions or waypoints) of the vehicle 102 operating in a normal mode in the field or worksite, whereas the second vehicular position is associated with a second position of the vehicle 102 in the tendering mode or tendering/resumption mode at the destination tendering location or at the destination tendering station (e.g., within a tendering zone or tendering area). Similarly, the first vehicular pose is associated with a first pose (e.g., heading angle, yaw angle or attitude) of the vehicle 102 operating in a normal mode in the field or worksite, whereas the second vehicular pose is associated with a second pose of the vehicle 102 in the tendering mode or tendering/resumption mode at the destination tendering location or at the destination tendering station (e.g., within a tendering zone or tendering area).

In conjunction with the fourth example in some embodiments, the second implement position and corresponding second implement pose (e.g., second implement heading angle, second implement yaw angle or second implement attitude) may be selected such that a fuel port on the implement 149 is spaced apart from a fuel pump, or refueling station by a target separation and angular range, or such that that a refilling port on the implement 149 is spaced apart from a sprayer tank by a target separation and angular range. In certain embodiments, the second implement position and corresponding second implement pose may be selected such that a recharging port (e.g., battery recharging port) on the implement is spaced apart from a battery charging station by a target separation and angular range. In other embodiments, the second implement position and corresponding second implement pose may be selected such that a battery zone on the implement is spaced apart from a battery replacement station by a target separation and angular range to support battery removal, replacement or swapping. In still other embodiments, the second implement position and corresponding second implement pose may be selected such that the implement 149 is spaced apart from service bay by a target separation and angular range, or located within a service bay region, such as a concrete slab, or gravel area for servicing, refueling or recharging the vehicle 102, or its implement 149.

The tendering mode may be executed in accordance with various techniques, that the controller 122 and electronic data processor 125 may apply separately or cumulatively with one another.

Under a first technique in the tendering mode, the electronic data processor 125 or controller 122 is configured to direct the vehicle 102 to appear at the destination tendering location if the end user activates the tendering mode (e.g., for a possible (scheduled) meeting with a requested or summoned service technician or mechanic or service robot). A destination, tendering or servicing location means any location for recharging, battery swapping, refueling, unloading, repairing, maintenance, or servicing where the vehicle 102 can be directed. For example, the servicing location may be within the headlands of field, on the edge of a worksite or field or elsewhere, where the servicing location may be accessible by a tender or supply vehicle.

Under a second technique, during the tendering mode, the electronic data processor 125, alone or together with the tendering/resumption management module 140 is configured to determine that the tendering or service are completed based upon one or more sensors (108, 109, 110), wherein the sensors 109 comprise a fuel sensor indicating that the fuel level of the vehicle 102 is above the upper threshold fuel level or a battery-state-of-charge sensor indicating that the state of charge of the battery exceeds the upper threshold charge level.

Under a third technique to prepare for transition to the tendering mode and the resumption mode, the electronic data processor 125, alone or together with the tendering/resumption management module 140, is directed to record or store in the data storage device (120, 124) (or in the cloud or at the central server 136) observed position and attitude data (e.g., from one or more GNSS receivers, 114, 214), such as a first position of the vehicle 102, a first pose or first attitude (e.g., first heading angle or first yaw angle) of the vehicle 102, a first implement state, a first position of the implement, a first pose or first attitude of the implement 149 (e.g., first heading angle or first yaw angle of the implement) and first implement settings for any potential return to or resumption of the normal mode after determining that the tendering or service are or were completed.

Under a fourth technique, the electronic data processor 125 or controller 122 is configured to send and present a predefined list of candidate destination tendering locations to the operator or end user, on or via a remote user interface 144, or a local end user interface, as a list of selectable radio buttons for corresponding candidate selections. For example, the destination, tendering or servicing location may be located at: (a) the start location or entry point of the vehicle 102 onto the work site or field, (b) the end of the current row of a path of vehicle 102 that is traversing a path plan that comprises a series of parallel rows that are connected by end turns at the end of each row; (c) the end of the next row of a path of a vehicle 102 after the vehicle 102 traverses the end of the current row, completes an end turn and begins to traverse the next row until its end. The user or operator may select the destination, tendering or service location from a predefined list of candidate destinations. In one embodiment, the predefined list of candidate destinations is presented to an under user or operator on or via a user interface (e.g., remote user interface 144 or local vehicle user interface) as a list of selectable radio buttons for corresponding candidate selections.

Under a fifth technique, the electronic data processor 125 or controller 122 is configured to send wirelessly the predefined list of candidate destination tendering locations to the remote user interface 144 via wireless communications over the wireless communications network 148 or via the satellite system 199 (e.g., where either wireless communications network 148 or satellite system 199 is used alone or together with the (terrestrial) communications network 135). Further, the predefined list of candidate tendering locations or candidate tendering stations (e.g., or accompanying preferential path plans to such tendering locations or candidate tendering stations) comprises the following: (a) the start location or entry point of the vehicle 102 onto the work site or field, (b) the end of the current row of a path of vehicle 102 that is traversing a path plan that comprises a series of parallel rows that are connected by end turns at the end of each row; or (c) the end of the next row of a path of a vehicle 102 after the vehicle 102 traverses the end of the current row, completes an end turn and begins to traverse the next row until its end. Further, in one embodiment, such predefined list of candidate destination tendering locations is presented to the end user on a user interface (144, 106) as a list of selectable radio buttons for corresponding candidate selections. For example, the predefined list of candidate destinations (e.g., in multiple choice format) is presented to an under user or operator on or via a user interface (e.g., remote user interface 144 or local (vehicle) user interface 106) as a list of selectable radio buttons for corresponding candidate selections.

Under a sixth technique in the tendering mode, the electronic data processor 125 or controller 122 is configured to generate a command (e.g. to generate and to transmit the command wirelessly or via a wireline or cable the interconnects the controller 122 to an implement controller 165 onboard the implement 149) to the implement controller 165, or implement actuator 159 to automatically raise and turn off the implement as the vehicle 102 leaves the (outer)

boundary of the field or worksite or upon entry into the headland (e.g., at an interior boundary of the parallel rows of the path plan). Therefore, the implement 149 raised and deactivated prior to or by reaching the destination tendering location, such as a start location or entry point of the vehicle 102 on the work site or field. In one embodiment, the implement controller 165 is electrically connected to or coupled to the vehicle data bus (198 or 197) of the vehicle 102, and the implement controller 165 is coupled to an actuator 159 that can raise or lower the implement or one or more of its ground engaging members (151, 154), or adjust the ground-engagement depth of the implement, among other things. For example, the electronic data processor 125 or controller 122 sends a command to the implement controller 165 for the implement actuator 159 to automatically raise and turn off (e.g., de-energize or disable) the implement 149 as the vehicle 102 leaves the (outer) boundary of the field or worksite. Conversely, the electronic data processor 125 controller 122 sends a command for the implement controller 122 to direct the implement actuator to automatically lower and turn on (e.g., energize or enable) the implement 149 upon entry into the headland, or (interior) field boundary, or entry into the exterior or outer boundary of the field.

The resumption mode may be executed in accordance with various procedures, that the controller 122 and electronic data processor 125 may apply separately or cumulatively with one another.

Under a first procedure in the resumption mode or the return mode, the path planning module 116 (e.g., path planner) and vehicle control network 104 (e.g., electronic data processing system) is configured to estimate preliminarily the return path of the vehicle 102 as the reverse path of the vehicle 102 from the destination tendering location to the stored first vehicular location of the operating mode for the vehicle location and the corresponding first implement location, wherein electronic data processor 125 and path planner are configured to modify (and refine) the reverse path such that one or more of the following conditions is satisfied: (a) the vehicle 102 returns to the first vehicular location along with the first vehicular pose (e.g., first attitude or first heading, or first yaw angle of the vehicle 102); (b) the implement 149 returns to the first implement location along with the first implement pose (e.g., first attitude, or first heading or first yaw angle of the implement), wherein such modification may comprise directing the vehicle 102 (and its implement 149) to complete one or more pose-adjusting or pose-compensating maneuver.

Under a second procedure in the resumption mode or the return mode, the path planning module 116 and the vehicle control network 104 is configured to estimate the pose-adjusting or pose-compensating maneuver that comprises a first turn of approximately 180 degrees in the headland of the field followed by traversing an adjacent or row skipping path and end-field turn to return to the row: (a) that intercepts the first vehicular position (e.g., first vehicular location) and (b) that conforms to one or more of the stored first vehicular pose (e.g., heading angle, yaw angle or attitude) of the vehicle 102, which are stored and accessed in the data storage device (124) or in the central server 136, or associated cloud data storage accessible via the communications network 135.

Under a third procedure in the resumption mode or the return mode, the path planning module 116 and the vehicle control network 104 is configured to estimate the pose-adjusting or pose-compensating maneuver that comprises a first turn of approximately 180 degrees in the headland of the field followed by traversing an adjacent or row skipping path and end-field turn to return to the row: (a) that intercepts the first implement position (e.g., first implement location) of the implement 149 and (b) that conforms to one or more of the stored first implement pose (e.g., heading angle, yaw angle or attitude) of the implement 149, which are stored and accessed in the data storage device (124) or in the central server 136, or associated cloud data storage accessible via the communications network 135.

Figure 2:
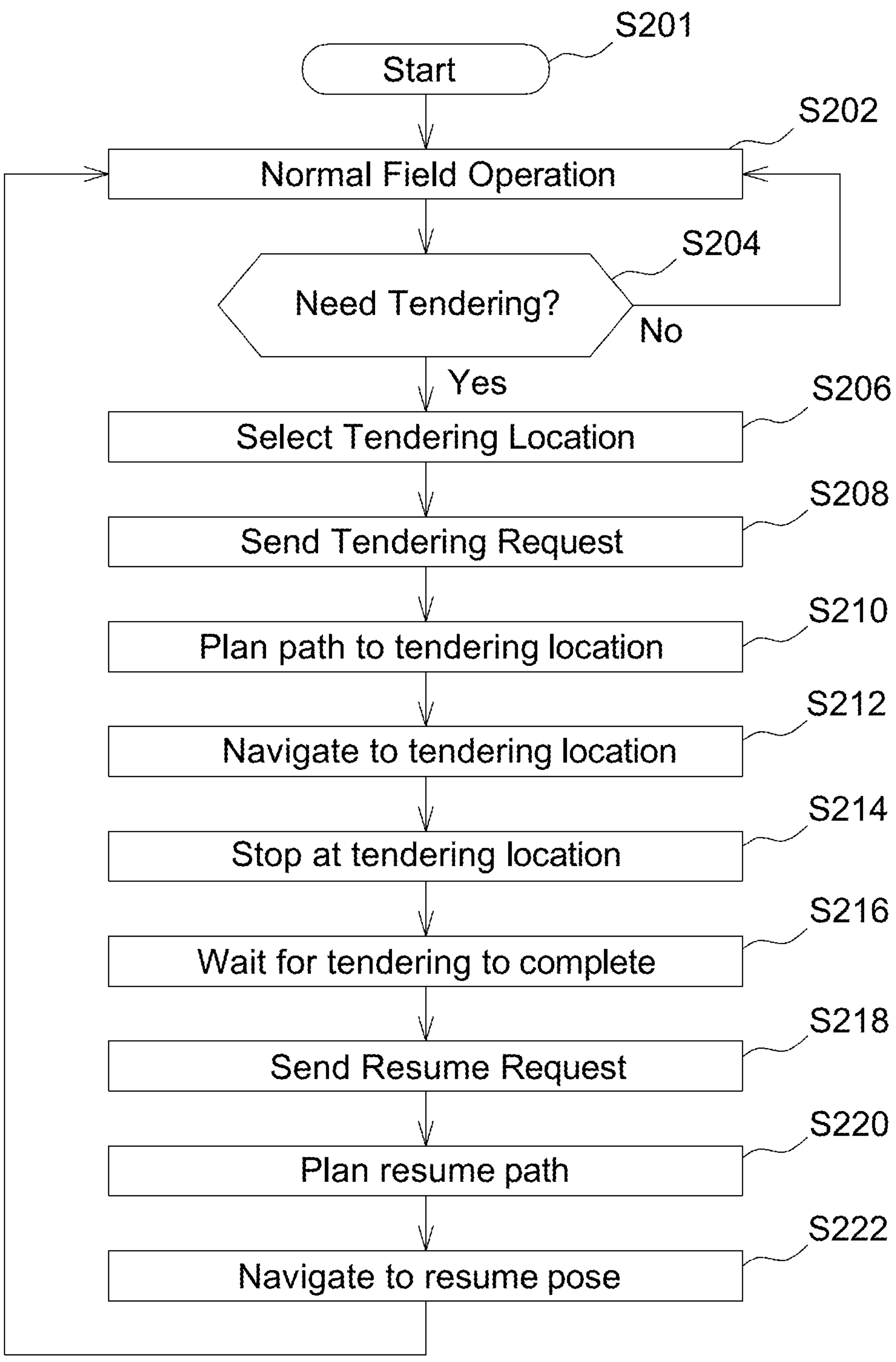
FIG. 2 is a flow chart of one embodiment of a method for controlling a path plan of the vehicle with tendering in accordance with the disclosure.

FIG. 2 is a flow chart of one embodiment of a method for controlling a path plan of the vehicle 102 with tendering in accordance with the disclosure. The method of FIG. 2 begins in step S201.

In step S202, the controller 122 or electronic data processor 125, in conjunction with the autonomy module, control the vehicle 102 to operate in a normal mode.

In step S204, the electronic data processor 125 or the controller 122, in conjunction with the tendering/resumption management model, are configured to evaluate sensor data from the third sensors 109 to determine whether tendering is required or whether communication of a potential tendering alert to the operator is required. For example, the controller 122 or electronic data processor 125 is configured to determine that the vehicle 102 requires tendering or service based upon one or more sensors 109, wherein the sensors 109 comprise a fuel sensor indicating that the fuel level of the vehicle 102 is below a lower threshold fuel level or a battery-state-of-charge sensor indicating that the state of charge of the battery (or energy storage system) is below a lower threshold charge level. For example, the fuel sensor is used if the vehicle 102 comprises an internal combustion engine, and the battery-state-of-charge sensor is used if the vehicle 102 comprises an electric motor, such as an electric drive motor for the propulsion system 157 in an electric vehicle, or a hybrid electric vehicle as the vehicle 102.

If tendering is not required or if the operator does not authorize tendering mode after receiving the tendering alert message on the user interface, the method continues with step S202; hence, normal mode of operating the vehicle 102 (and its implement 149) is continued. However, if tendering is required or if the operator authorizes tendering mode after receiving the tendering alert message on the user interface, the method continues in step S206.

In step S206, the operator is informed via the user interface (106, 144) to select a destination tendering location. For example, electronic data processor 125 or controller 122 is configured to send and present a predefined list of candidate destination tendering locations to the operator or end user, on or via a remote user interface 144, or a local user interface 106, as a list of selectable radio buttons for corresponding candidate selections. Further, the destination, tendering or servicing location may be located at: (a) the start location or entry point of the vehicle 102 onto the work site or field, (b) the end of the current row of a path of vehicle 102 that is traversing a path plan that comprises a series of parallel rows that are connected by end turns at the end of each row; (b) the end of the next row of a path of a vehicle 102 after the vehicle 102 traverses the end of the current row, completes an end turn and begins to traverse the next row until its end. In one embodiment, the predefined list of candidate destinations is presented to an under user or operator on or via a user interface (e.g., remote user interface 144 or local (vehicle) user interface 106) as a list of selectable radio buttons for corresponding candidate selections.

In step S208, the operator sends the tendering request with the selected candidate destination for the tendering. The user or operator may select the destination, tendering or service location from a predefined list of candidate destinations. For example, the operator sends or transmits wirelessly the tendering request with the candidate destinations for the tendering from the first wireless communications device 129 (e.g., remote wireless communications device) to the second wireless communications device 128 (e.g., vehicle wireless communications device), directly, or indirectly via a wireless communications system 148 or satellite system 199.

In step S210, the path planning module 116 or electronic data processor 125 generates a path plan to from the field location to the destination tendering location or the destination tendering station. First, the path plan will depend upon the destination tendering location or destination servicing location that the operator authorized or selected or entered (e.g., from a predefined list of candidate destination tendering locations) via the user interface (144 or 106), such as: (a) the start location or entry point of the vehicle 102 onto the work site or field, (b) the end of the current row of a path of vehicle 102 that is traversing a path plan that comprises a series of parallel rows that are connected by end turns at the end of each row; (d) the end of the next row of a path of a vehicle 102 after the vehicle 102 traverses the end of the current row, completes an end turn and begins to traverse the next row until its end. Further, the predefined list of candidate destinations is presented to an under user or operator on or via a user interface (e.g., remote user interface 144 or local (vehicle) user interface 106) as a list of selectable radio buttons for corresponding candidate selections. Second, to prepare for transition to the tendering mode and the resumption mode, the electronic data processor 125, alone or together with the tendering/resumption management module 140 is directed to record or store in the data storage device (120, 124) (or in the cloud or at the central server 136) stored position and attitude data 126, such as a first position of the vehicle 102, a first pose or first attitude (e.g., first heading angle or first yaw angle) of the vehicle 102, a first implement state, a first position of the implement 149, a first pose or first attitude of the implement (e.g., first heading angle or first yaw angle of the implement) and first implement settings for any potential return to or resumption of the normal mode after determining that the tendering or service are or were completed.

In step S212, the electronic data processor 125 or the controller 122, in conjunction with the guidance module 118, and one or more GNSS receivers (114, 214) navigates or directs the vehicle 102 to the destination tendering location or destination tendering station. The electronic data processor 125 or controller 122 is configured to direct the vehicle 102 to appear at the destination tendering location (e.g., for a possible (scheduled) meeting with a requested or summoned service technician or mechanic or service robot) if the end user activates the tendering mode. A destination, tendering or servicing location means any location for recharging, battery swapping, refueling, unloading, repairing, maintenance, or servicing where the vehicle 102 can be directed. For example, the servicing location may be within the headlands of field, on the edge of a worksite or field or elsewhere, where the servicing location may be accessible by a tender or supply vehicle 102.

In step S214, he electronic data processor 125 or the controller 122, in conjunction with the guidance module 118, and one or more GNSS receivers (114, 214) navigates or directs the vehicle 102 to stop at the destination tendering location that is aligned with a vehicle target position for the vehicle 102, a implement target position for the implement 149, a vehicle target attitude or vehicle target pose, and an implement target attitude and implement target pose for the implement 149. For example, the vehicle 102 may be aligned for servicing adjacent to fuel pump, a concrete slab, a level gravel area, or a service bay of a servicing location.

In step S216, the electronic data processor 125 or the controller 122 wait for the tendering to be completed. For example, during the tendering mode, the electronic data processor 125, alone or together with the tendering/resumption management module 140 is configured to determine that the tendering or service are completed based upon one or more sensors (108, 109, 110), wherein the sensors 109 comprise a fuel sensor indicating that the fuel level of the vehicle 102 is above the upper threshold fuel level or a battery state of charge sensor indicating that the state of charge of the battery exceeds the upper threshold charge level.

In step S218, the electronic data processor 125 or controller 122 sends a resume request to exit the tendering mode and to transition to the resumption mode, where the vehicle 102 returns to the work task, last vehicular position, and corresponding vehicle pose (e.g., heading angle or yaw angle) that was interrupted in the field prior to tendering and operation in the tendering mode. The electronic data processor 125 or the controller may execute step S218 in accordance with various techniques that may be applied separately or cumulatively.

Under a first technique, the electronic data processor 125 or controller 122 sends a resume request to exit the tendering mode and to transition to the resumption mode, where the vehicle 102 returns to the last work task, last vehicular position, and last corresponding vehicle pose (e.g., heading angle or yaw angle) that was interrupted in the field prior to tendering and operation in the tendering mode and corresponding steering wheel angle of the vehicle 102. Here, the modifier last may refer to the previously interrupted task, vehicular position, vehicle pose and steering wheel angle immediately prior to entering the tendering mode or tendering.

Under the second technique, in the resumption mode or the return mode, the path planner and electronic data processing system is configured to estimate preliminarily the return path of the vehicle 102 as the reverse path of the vehicle 102 from the destination tendering location to the (stored) first vehicular location and the corresponding first implement location, wherein electronic data processor 125 and path planner are configured to modify the reverse path such that one or more of the following conditions is satisfied: (a) the vehicle 102 returns to the first vehicular location along with the first vehicular pose (e.g., first attitude or first heading, or first yaw angle of the vehicle 102), (b) the implement 149 returns to the first implement location along with the first implement pose (e.g., first attitude, or first heading or first yaw angle of the implement 149), wherein such modification may comprise directing the vehicle (e.g., 102) (and its implement 149) to complete one or more pose-adjusting or pose-compensating maneuver.

In step S220, an electronic data processor 125 or controller 122 in conjunction with the path planner or the tendering/resumption management module 140 plans a resume path to return the vehicle 102 to the first vehicular position in the field, and to return any implement 149 to the first implement position in the field, consistent with: (a) the corresponding first vehicular pose (e.g., first vehicular heading angle) and (b) first implement pose (e.g., first implement heading angle). Further, an electronic data processor 125 or controller 122 in conjunction with the path planner or the tendering/resumption management module 140 plans a resume path to return the vehicle 102 to the first vehicular position in the field, and to return any implement 149 to the first implement position in the field, consistent with a first steering angle of the vehicle 102 (corresponding to the first pose of the vehicle 102). For example, in the resumption mode or the return mode, the path planner and electronic data processing system is configured to estimate the pose-adjusting or pose-compensating maneuver that comprises a first turn of approximately 180 degrees in the headland of the field followed by traversing an adjacent or row skipping path and end-field turn to return to the row that intercepts the first location that conforms to the saved first pose of the vehicle 102 (and its implement 149).

Figure 3:
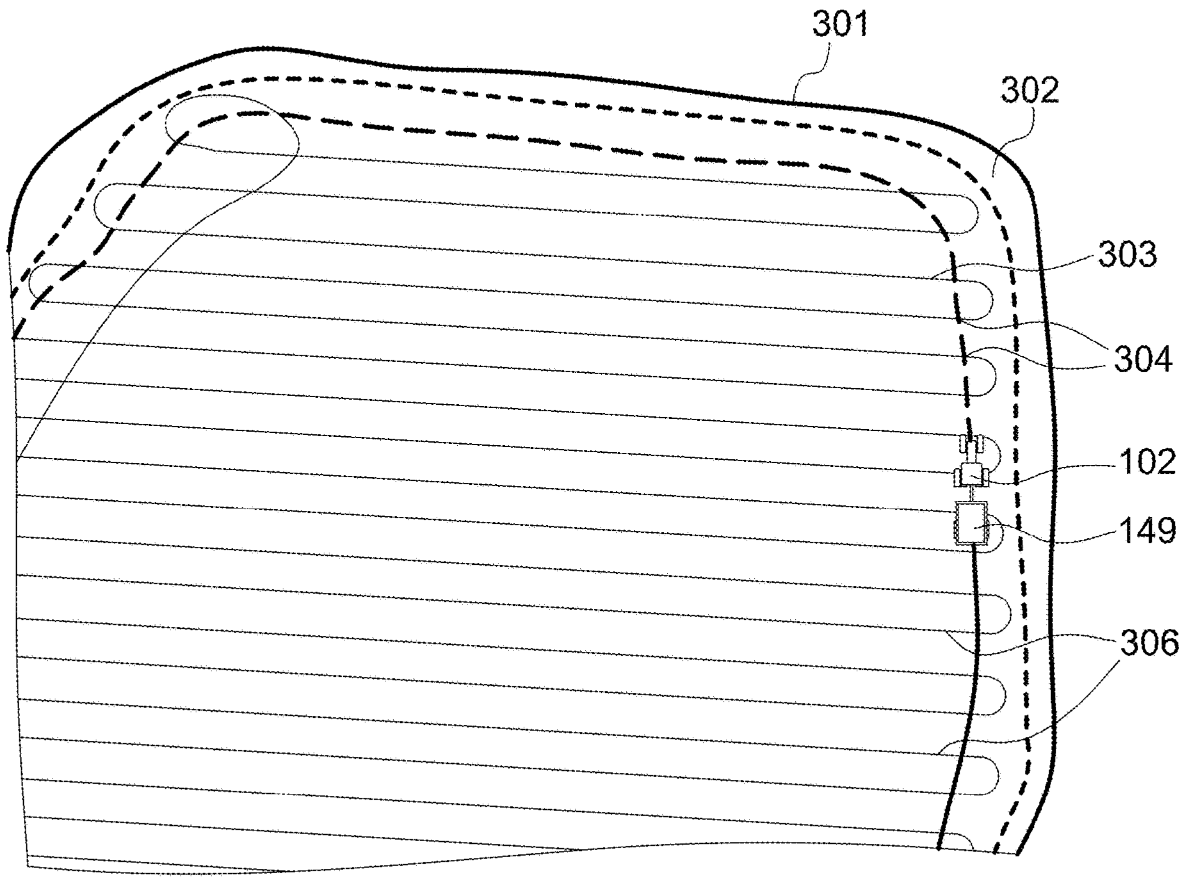
FIG. 3 is an illustrative example of a field or work site in which a vehicle, which is equipped with an implement, works in accordance with a path plan of the vehicle.

In an alternate embodiment of FIG. 3, the guidance module 118 and the path planning module 116, in conjunction with one or more GNSS receivers (114, 214) in the PPP mode or RTK mode, are configured to determine the optimal path to the operator-requested destination tendering station, such as deciding whether to complete the current row or proceed to the next row before reaching the destination tendering station. Accordingly, the electronic data processor 125 can follow software instructions in the path planning module 116 to evaluate whether the first vehicular pose or the second vehicular pose are repeatably registerable consistent with a preferential (e.g., best) stop pose (at the destination tendering station) and preferential (e.g., best) return pose (in the field or work site along a row), alone or together with the first vehicular steering angle. Accordingly, the path planning module 116 or the electronic data processor 125 is capable of determining the preferential stop pose for servicing, refueling, or refueling and return pose for efficiently resuming the work task with precise alignment with the stopping position and row alignment to minimize row overlap or lateral offset to the adjacent row or rows that might otherwise occur. For example, the path planning module 116 or electronic data processor 125 is configurated to plan the stop pose at the destination tendering station to ensure the stop pose is positioned away from the (outer) field boundary and the (interior field boundary), and is conducive to a clear and efficient path to promote smooth resumption of operation in the field after tendering.

In certain embodiments, the target stop location of the destination tendering station, planned path to the target stop location of the destination tendering station, and current vehicle position are transmitted to a remote user interface 144, such as a mobile device for display and confirmation.

In some embodiments, if the vehicle 102 is on a headland path, the vehicle continues traversing through the headland until finding the nearest point for transitioning to the stop location or destination tendering station. The electronic data processor 125 is configured to execute the software instructions in the autonomy control module 138 or the tendering/resumption management module 140 to manage the implement 149 by raising the implement 149 during the transition or preparing to exit interior boundary to the headland and lowering the implement 149 after stopping and preparing to enter the interior boundary from the headland.

FIG. 3 is an illustrative example of a field or work site in which a vehicle 102, which is equipped with an implement 149, works in accordance with a path plan or planned path 306 of the vehicle 102). The vehicle 102 tows or moves an implement 149 that performs a work task, such as tilling, cultivating, planting, spraying, treating or harvesting the soil or plants. In an alternate embodiment, the vehicle 102 has an implement that does earth-moving, leveling, dozing, digging, The vehicle 102 and its implement 149 track or follow a planned path 306 or path plan of one or more parallel rows 303. As illustrated in FIG. 3, each row 303 has a generally linear segment that is interconnected by end-of-row turns 304 or end-turns, such as key-hole turns, row skipping turns, or approximately one-hundred and eighty degree turns. In some fields or worksites, there is a perimeter gap between the end of row turn or end-of-row turn 304 and the field boundary 301 or edge of the field or work area. The area within the perimeter gap is referred to as a headland area 302, which can be cultivated and treated as productive land on which crops are planted, or where a section or portion of the headland area 302 can be designated as a destination tendering location or destination tendering station. For example, the destination tendering location or destination tendering station may comprise: (a) a building, a slab, level ground, paved area, gravel area, or road portion upon which the vehicle 102, its implement 149, or both can be refueled, recharged or otherwise serviced, (b) where such building, a slab, level ground, paved area, gravel area, or road portion is located at or near an entrance to the field or worksite. Consistent with the path plan, the tendering station can be at the field entrance, at the end of the current field track or row 304 (e.g., and in the headland 302), or at end of the next field track or next row (e.g., and in the headland 302). As part of the path plan, the vehicle (e.g., 102) and its implement may traverse a perimeter of the field to cover the headland by tilling, cultivating, plowing, planting, seeding, spraying, treating or harvesting, where the headland dimensions and shape and where the implement 149 width determines an offset from the edge or boundary 301 of the field.

Figure 4:
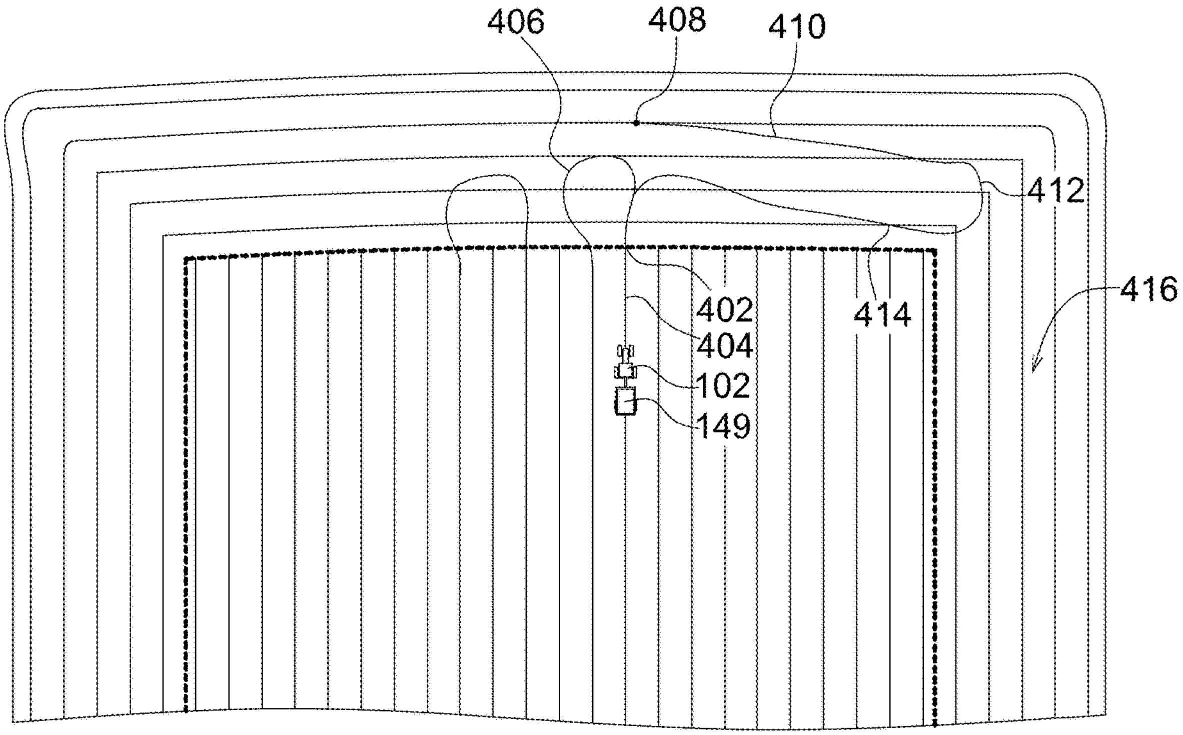
FIG. 4 provides an illustrative example of a vehicle that can either complete an end turn or approach a destination tendering location in a headland of the field consistent with the path plan of the vehicle and end user instructions or commands.

FIG. 4 provides an illustrative example of a vehicle 102 that can either complete an end turn or approach a destination tendering location in a headland of the field consistent with the path plan or planned path of the vehicle 102 and end user instructions or commands. In FIG. 4, the vehicle 102 (e.g., tractor) that tows or moves an implement 149 is heading upward along a row 404, consistent with a planned path or path plan, where the vehicle 102 approaches an interior boundary 402 (or interior edge) of the field that defines a boundary between the rows 404 and the headland 416. At the interior boundary 402 as the vehicle 102 approaches from the row within the field, the electronic data processor 125 or controller 122 is configured to do any of the following: to pause or stop the vehicle 102 for a transition period, to disable the implement 149, such as raising the implement (e.g., from engagement with the ground), deactivating power (electrical or rotational energy) to the implement 149, or conducting other implement shut-down processes. Further, at the interior boundary 402, the electronic data processor 125, the path planning module 116 or the guidance module 118, in conjunction with one or more GNSS receivers (114, 214), directs a vehicle 102 to: (a) first, turn in the headland 416 in a generally perpendicular direction or perpendicular path 414 with respect to the row 402 and the current direction of travel (e.g., while disregarding any normal pre-planned end-of-row turn 406 called for in the path plan), (b) second, complete an approximately one-hundred and eighty degree turn 412 or direction reversal turn, such that the vehicle 102 approaches, along a post-turn path 410, the destination tendering location 408 or destination tendering station at the bold point with the second vehicular position and the corresponding second vehicular pose (e.g., heading angle, yaw angle, or attitude).

Figure 5:
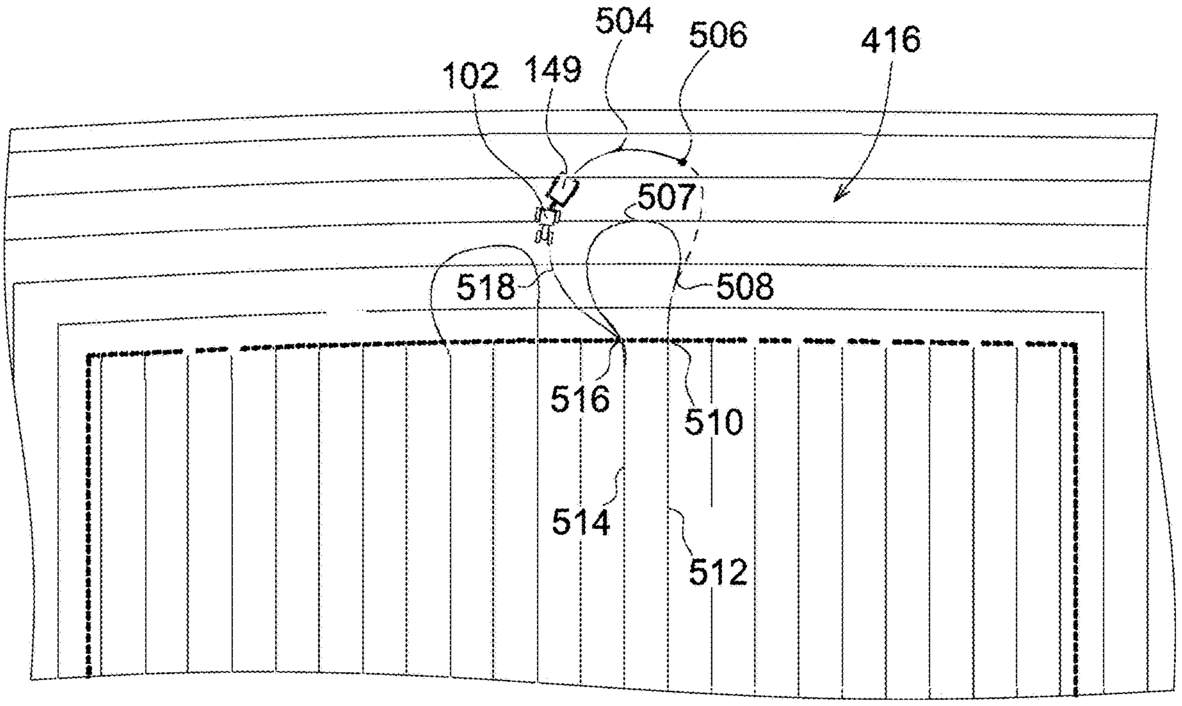
FIG. 5 provides an illustrative example of a vehicle that can is approaching or returning from a destination tendering location in a headland of the field consistent with the path plan of the vehicle.

FIG. 5 provides an illustrative example of a vehicle 102 that is approaching or returning from a destination tendering location 506 in a headland 416 of the field consistent with the path plan of the vehicle 102. FIG. 5 provides an illustrative example of a vehicle 102 that after completing a first row 512 has already bypassed a standard end turn 507 (that would connect to second row 514) with a wide turn 508 (which is indicated by the dashed lines above the interior boundary 510) in the headland 416 to approach a destination tendering location 506 in a headland of the field. After receiving a command to tender or go to a tendering location from a remote user interface 144, the guidance module 118 and path planning module 116, in conjunction with one or more GNSS receivers (114, 214), are configured to direct the vehicle 102 to follow a wide turn 508 that takes a trajectory of a curved path consistent with the path plan of the vehicle 102 and end user instructions or commands. In FIG. 5, the vehicle 102 (e.g., tractor) that tows or moves an implement is heading upward along the curved path of the wide turn 508 within the headland 416, consistent with a planned path or path plan after exiting an interior boundary 510 (or interior edge) of the field that defines a boundary between the rows and the headland.

In FIG. 5, at the interior boundary 510 as the vehicle 102 approached from the row 512 within the field, the electronic data processor 125 or controller 122 is configured to do any of the following: to pause or stop the vehicle 102 for a transition period, to disable the implement 149, such as raising the implement 149 (e.g., from engagement with the ground), deactivating power (electrical or rotational energy) to the implement 149, or conducting other implement shutdown processes. Further, at the interior boundary 510, the electronic data processor 125, the path planning module 116 or the guidance module 118 directs a vehicle 102 (e.g., within a single efficient loop in the headland with a destination tendering location or destination tendering location 506 as an intermediate waypoint) to: (a) first, turn wide in the headland 416 with respect to the first row 512 and the current direction of travel; (b) second, traverse about ninety degrees of an approximately one-hundred and eighty degree turn (or a wide direction reversal turn), such that the vehicle 102 approaches the destination tendering location 506 or destination tendering station at the bold point with the second vehicular position and the corresponding second vehicular pose (e.g., heading angle, yaw angle, or attitude); (c) third, traverse about (another) ninety degrees arc (504, 518) of the approximately one-hundred and eighty degree turn to return the vehicle 102 and implement to a second row 514 that intercepts the interior boundary 516 between the interior first row 512 and second row 514, collectively, and headland 416, where the vehicle 102 will be heading (with third pose, or with a third angular heading or third yaw angle) in the opposite direction (downward in FIG. 5 along the second row 514 in contrast to upward along the first row 512 consistent with the first pose).

Figure 6:
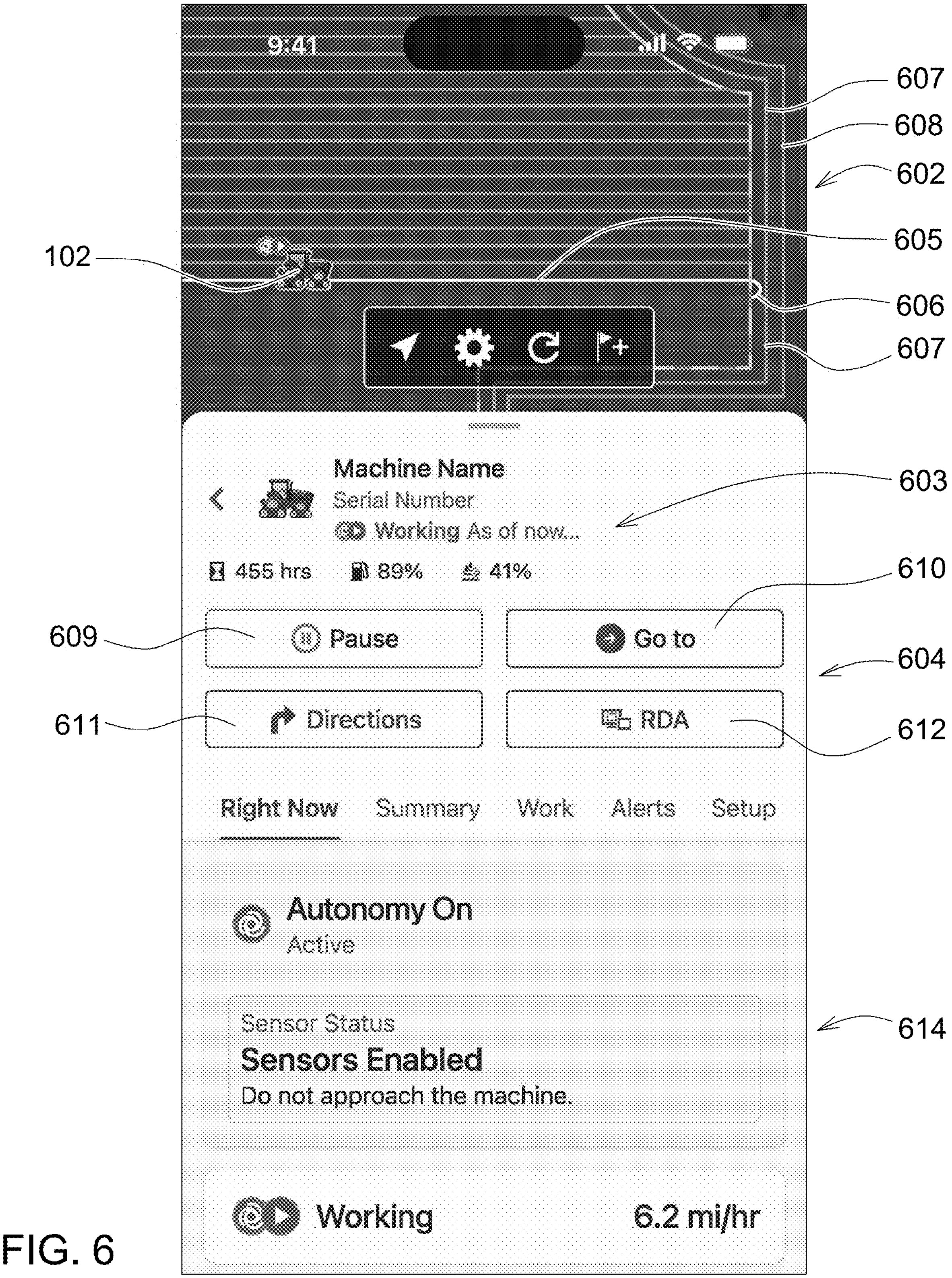
FIG. 6 illustrates a first example of a screen (e.g., with relative position of vehicle along a path plan in a field map portion, status indicators and control buttons) on a user interface or remote user interface for a vehicle, such as an autonomous, semi-autonomous vehicle or remote controlled vehicle.

FIG. 6 illustrates a first example of a screen (e.g., with relative position of vehicle (e.g., 102) along a path plan in a field map portion 602, status indicators 603 and control buttons 604) on a user interface or remote user interface 144 for a vehicle (e.g., 102), such as an autonomous, semi-autonomous vehicle or remote controlled vehicle. As shown in FIG. 6, the upper portion of the screen has a field map portion 602 that includes an icon representation of the vehicle 102 traveling along a row 605 of the path plan that indicates the position of the vehicle 102 on the field with respect to an upcoming end turn 606 at the end or the row and the headland 607 around the perimeter 608 of the field.

Status indicators 603 indicates display the number of active machine hours that the vehicle 102 or machine has been on, the fuel level and the estimated time to complete a current work task. A set of control buttons 604 are provided: (a) to pause the vehicle 102 (e.g., as pause button 609), or (b) to direct the vehicle 102 to a specific destination tendering location as specified on another (run) screen or modular (run) screen portion upon pressing or activating a "go-to" button 610, (c) to control remote display access (RDA) mode by pressing or toggling the RDA mode button 612, which verifies whether the RDA mode can be properly authenticated and entered (or exited) given the current state (e.g., availability for remote wireless access) of the vehicle 102 or its system (e.g., autonomous state of the vehicle), (d) to request directions (e.g., via a directions button 611) to a specific waypoint or destination that is predefined on a list on a separate (run) screen or modular (run) screen portion, such as storage building for housing the vehicle, a particular field entrance location, a destination tendering location, a flagged waypoint on the field or in the headlands.

The screen further has additional status indicators 614 such as one or more of the following: (1) whether or not an autonomous mode or other mode of the vehicle is active or inactive, (2) whether or not the sensors are enabled, and (30 whether the vehicle and its machine are working, and (4) at what rate or ground speed in the field or at the worksite the vehicle is working or moving. When the sensors are enabled, at the remote interface the screen may indicate to the operator or user not to approach the machine, which can apply if the operator is in the field or if the operator is in communication with another in the field.

Figure 7:
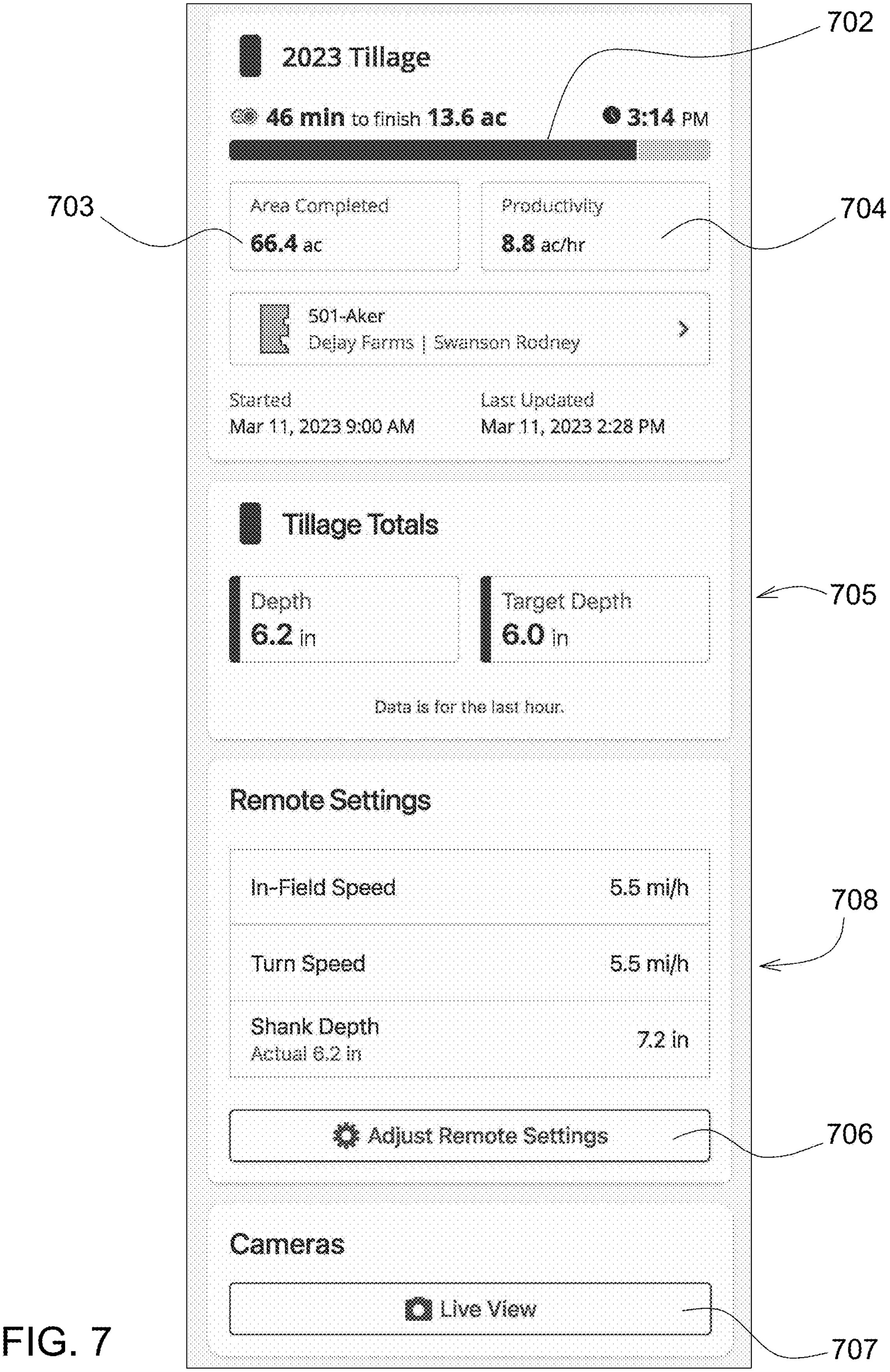
FIG. 7 illustrates a second example of a screen (e.g., with relative time of vehicle to finish work task along a complete path plan, implement settings, status indicators, implement control, camera view on/off, and other control buttons) on a user interface or remote user interface for a vehicle, such as an autonomous, semi-autonomous vehicle or remote controlled vehicle.

FIG. 7 illustrates a second example of a screen (e.g., with relative time 702 of vehicle 102) to finish work task along a complete path plan, implement settings, status indicators, implement control, camera view on/off, and other control buttons) on a user interface or remote user interface 144 for a vehicle (e.g., 102), such as an autonomous, semi-autonomous vehicle or remote controlled vehicle. In FIG. 7, the screen provides a relative time 702 of a vehicle to finish a current work task (e.g., consistent with a current path plan), the area completed 703 or the area remaining to be completed in accordance with the current work task, and optionally a productivity rating 704 of the vehicle (e.g., 102) in area per unit time (e.g., acres or hectares per hour). Further, the screen may provide implement settings and status indictors 705, such as tillage tool depth, a target depth, ground speed, turn speed, shank depth.

An implement control button, labeled adjust remote settings 706, directs the remote operator to another screen in which the implement settings or remote settings 708 can be adjusted, changed or the like. A camera application button 707 provides a screen portion with a live view around the vehicle 102, such as in front of the vehicle 102, in back of the vehicle 102, or to either or both sides of the vehicle 102, where in some configurations a birds-eye view or virtual birds-eye view of the vehicle 102 is provided on the remote user interface 144 in real time.

Figure 8:
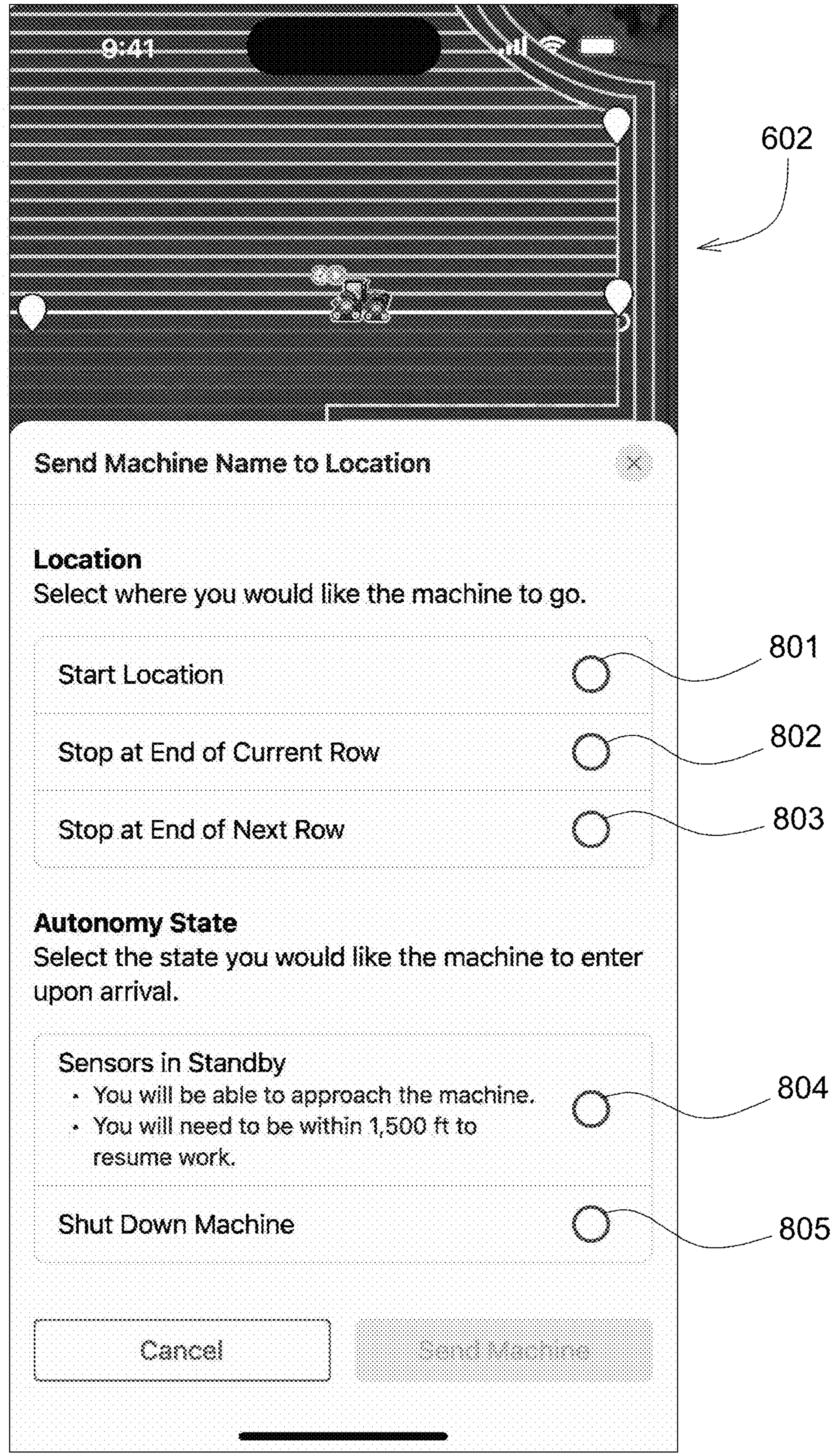
FIG. 8 illustrates a third example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 8 illustrates a third example of a screen (e.g., with relative position of vehicle 102 along a path plan in a field map portion, (autonomy) status indicators and control, and go-to control buttons) on a user interface or remote user interface 144 for a vehicle 102, such as an autonomous, semi-autonomous vehicle or remote controlled vehicle. In one embodiment, the remote user interface 144 displays the screen of FIG. 8 after the go-to button 610 is pressed or activated in FIG. 6, where the vehicle electronics or system 11 sends to the remote wireless device a predefined list of candidate tendering locations for display on the remote user interface 144. Further, on the electronic display of the remote user interface 144, the operator is given a choice to select from a predefined list of candidate destination tendering locations (or destination tendering stations) as follows: (a) the start location or entry point of the vehicle (e.g., 102) onto the work site or field (e.g., which is referred to as "start location" radio button 801); (b) the end of the current row of a path of vehicle 102 that is traversing a path plan that comprises a series of parallel rows that are connected by end turns at the end of each row (e.g., which is referred to as the "stop at end of current row radio button 802); or (c) the end of the next row of a path of a vehicle 102 after the vehicle 102 traverses the end of the current row, completes an end turn and begins to traverse the next row until its end (e.g., which is referred to as the "stop at end of next row" radio button 803).

In an alternate embodiment, the guidance module 118 and the path planning module 116 may recommend a destination tendering location or a corresponding preferential path plan that is consistent with the current row radio button 802 or the next row radio button 803 and prepopulate the applicable current row radio button 802 or next row radio button 803 with the appropriate selection or activation of the radio button.

In one embodiment, the vehicle 102 may operate in an autonomous state, such as an user-defined or operator-defined autonomous state of the vehicle 102 (e.g., machine) to enter upon arrival at the destination tendering location or destination tendering station, such as: (a) sensors in standby mode (e.g., as indicated by the sensor standby mode radio button 804) or (b) shut down vehicle 102 or machine (e.g., as indicated by the shut-down radio button 805). If the sensors are in standby, upon arrival at the destination tendering location one will be able to approach the vehicle 102 and one will need to be within 1,500 feet or another appropriate zone to resume work in the field.

After the user selects, defines or enters the to-go location and the autonomous arrival state, the operator can cancel the request or the operator can confirm the request or send the request to the vehicle 102 for proper execution. As shown in FIG. 8, the upper portion of the screen has a field map portion that includes an icon representation of the vehicle 102 traveling along a row of the path plan that indicates the position of the vehicle 102 on the field with respect to an upcoming end turn at the end or the row and the headland around the perimeter of the field.

The tendering station can be the field entrance, end of the current field track, or end of the next field track.

Figure 9:
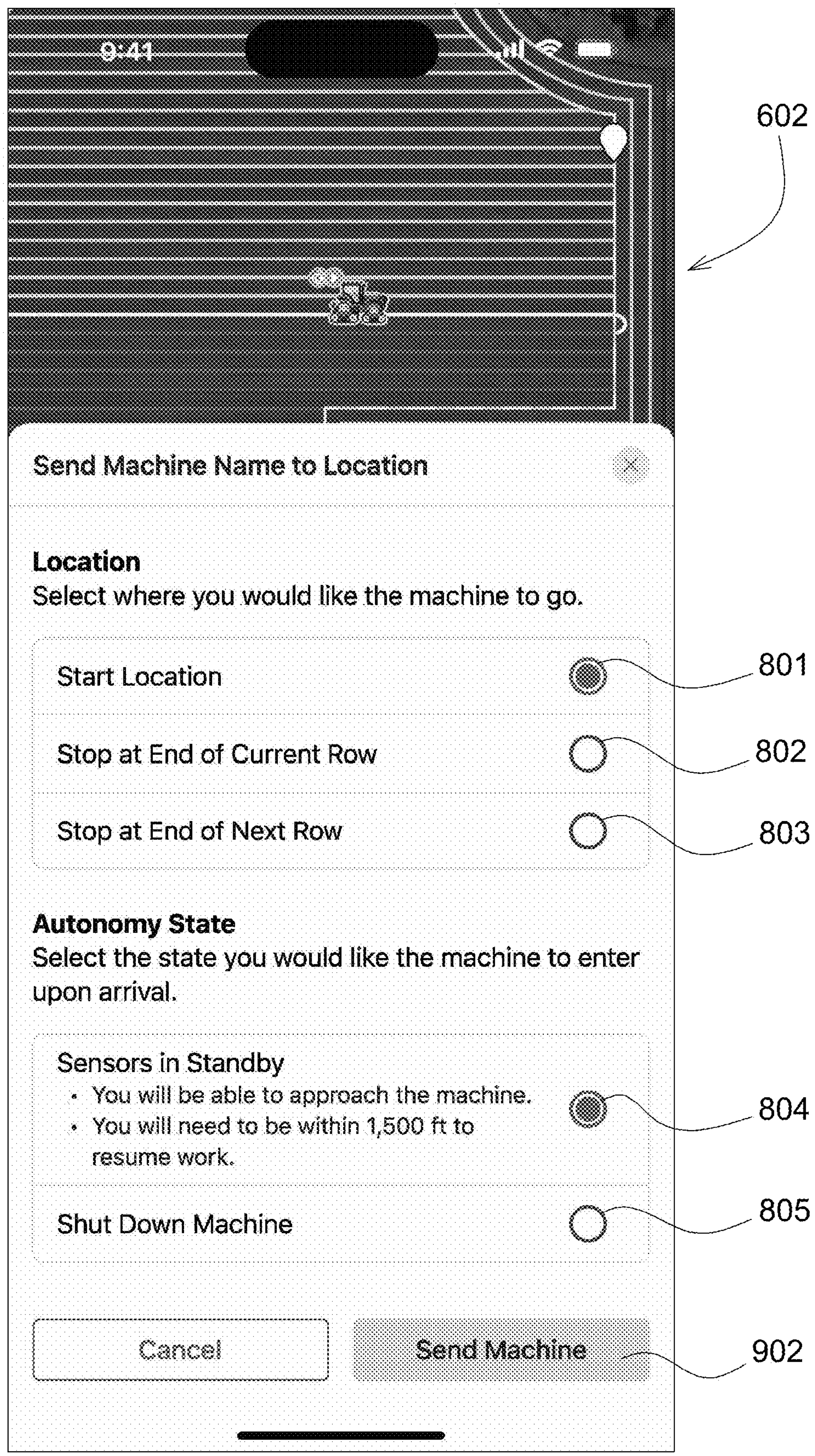
FIG. 9 illustrates a fourth example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 9 illustrates a fourth example of a screen (e.g., with relative position of vehicle 102) along a path plan in a field map portion 602, (autonomy) status indicators and control buttons (804, 805), and go-to control buttons) on a user interface or remote user interface 144 for a vehicle 102, such as an autonomous, semi-autonomous vehicle or remote controlled vehicle. At the remote user interface 144, the exemplary screen of FIG. 9 is similar to the screen of FIG. 8, except in FIG. 9 the start location button 801 (e.g., radio button) is selected as the destination tendering location, the sensors in stand-by mode button 804 (e.g., radio button) is selected to allow the vehicle 102 to be approached at the destination tendering location and the send machine button 902 is activated to send a mission command wirelessly from the remote user interface 144 to the vehicle 102, via the first communications device, the second communications device and a wireless communications system, for example. Like reference numbers in FIG. 8 and FIG. 9 indicate like features, elements, or processes.

Figure 10:
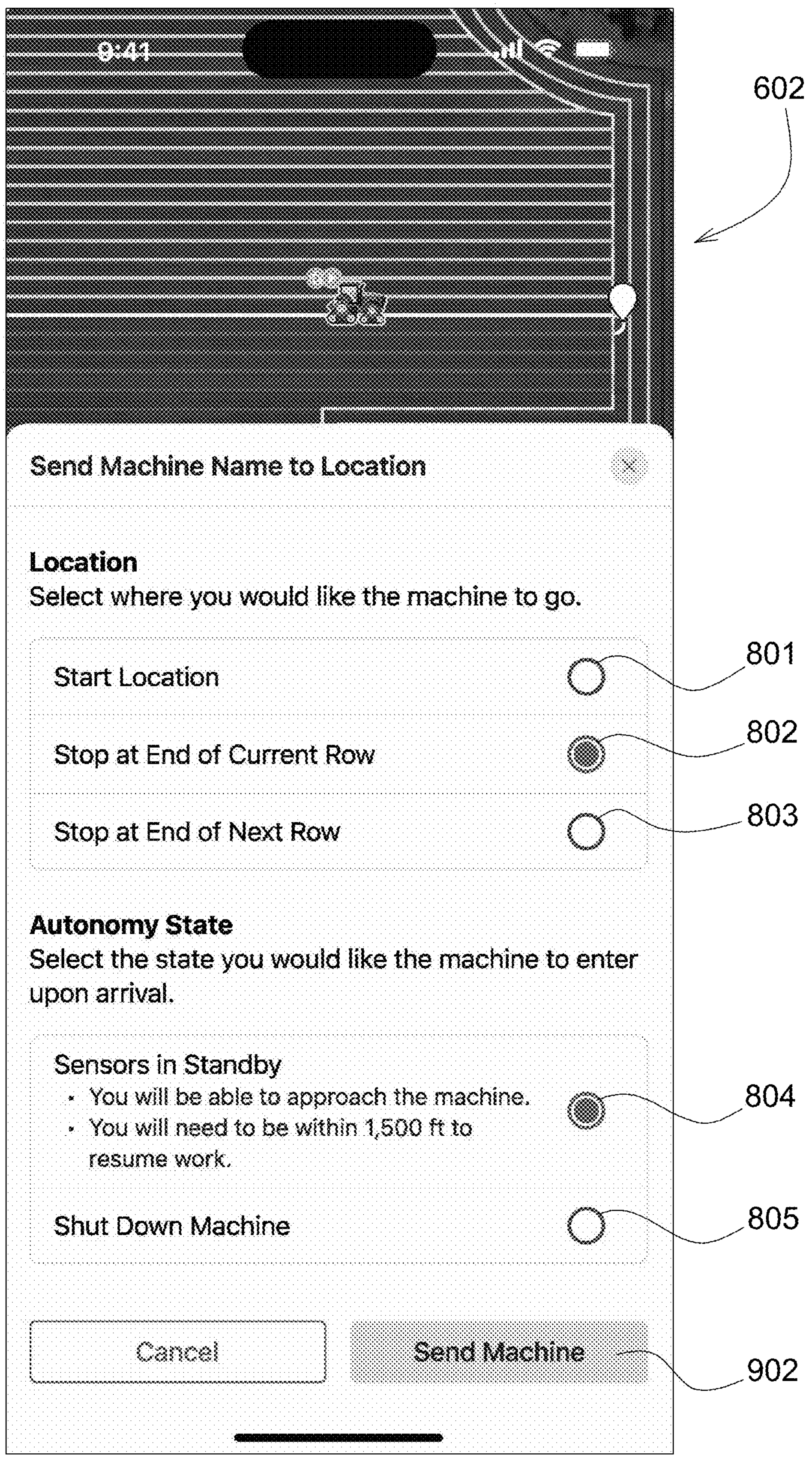
FIG. 10 illustrates a fifth example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 10 illustrates a fifth example of a screen (e.g., with relative position of vehicle 102 along a path plan in a field map portion, (autonomy) status indicators and control, and go-to control buttons) on a user interface or remote user interface 144 for a vehicle 102, such as an autonomous, semi-autonomous vehicle or remote controlled vehicle. At the remote user interface 144, the exemplary screen of FIG. 10 is similar to the screen of FIG. 8, except in FIG. 10 the current row 802 (e.g., radio button) is selected as the destination tendering location, the sensors in stand-by mode button 804 (e.g., radio button) is selected to allow the vehicle 102 to be approached at the destination tendering location and the send machine button 902 is activated to send a mission command wirelessly from the remote user interface 144 to the vehicle 102, via the first communications device, the second communications device and a wireless communications system, for example. Like reference numbers in FIG. 8 and FIG. 10 indicate like features, elements, or processes.

Figure 11:
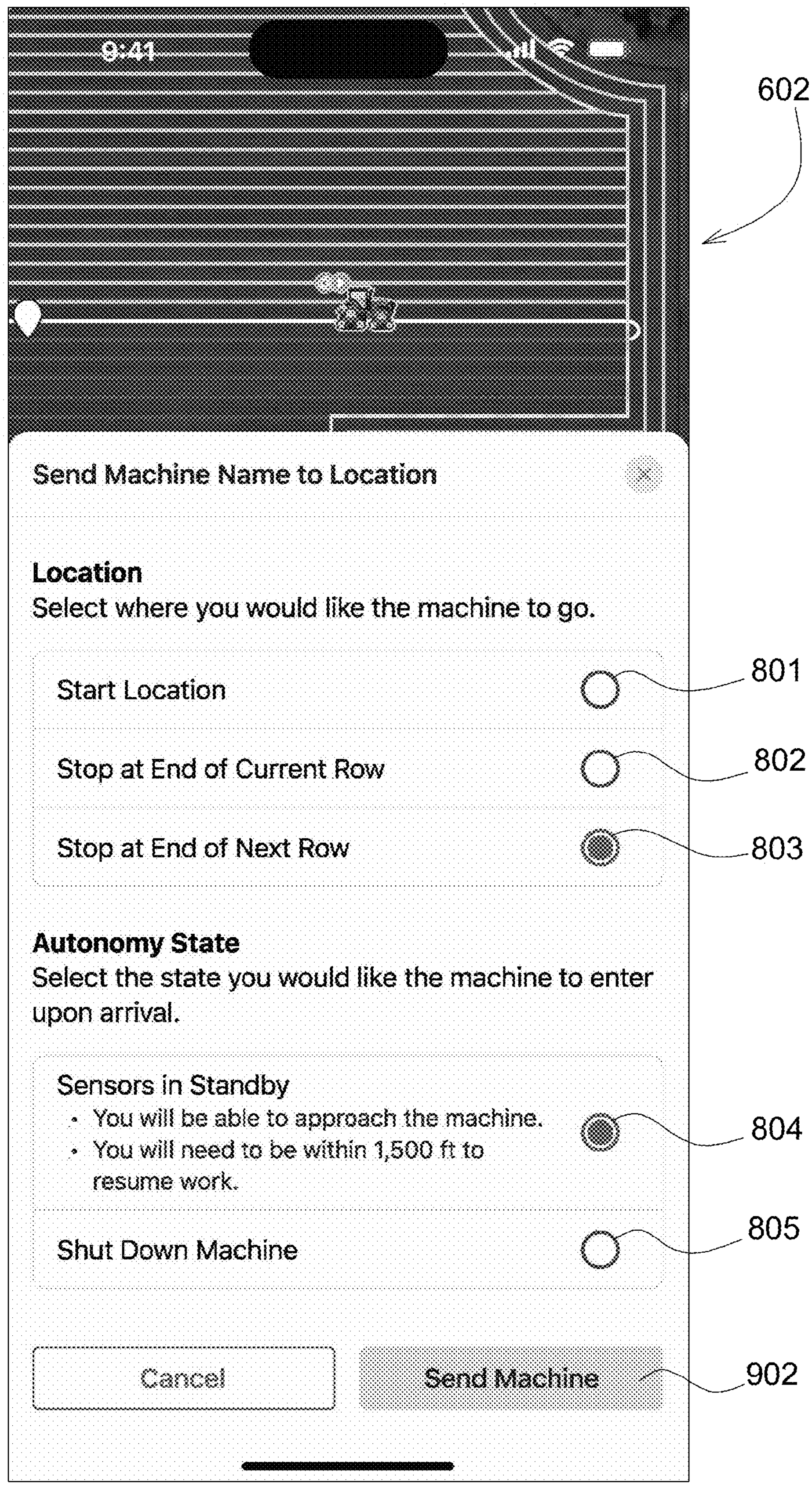
FIG. 11 illustrates a sixth example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 11 illustrates a sixth example of a screen (e.g., with relative position of vehicle 102 along a path plan in a field map portion, (autonomy) status indicators and control, and go-to control buttons) on a user interface or remote user interface 144 for a vehicle 102, such as an autonomous, semi-autonomous vehicle or remote controlled vehicle. At the remote user interface 144, the exemplary screen of FIG. 11 is similar to the screen of FIG. 8, except in FIG. 11 the next row button 803 (e.g., radio button) is selected as the destination tendering location, the sensors in stand-by mode 804 (e.g., radio button) is selected to allow the vehicle 102 to be approached at the destination tendering location and the send machine button 902 is activated to send a mission command wirelessly from the remote user interface 144 to the vehicle 102, via the first communications device, the second communications device and a wireless communications system, for example. Like reference numbers in FIG. 8 and FIG. 11 indicate like features, elements, or processes.

Figure 12:
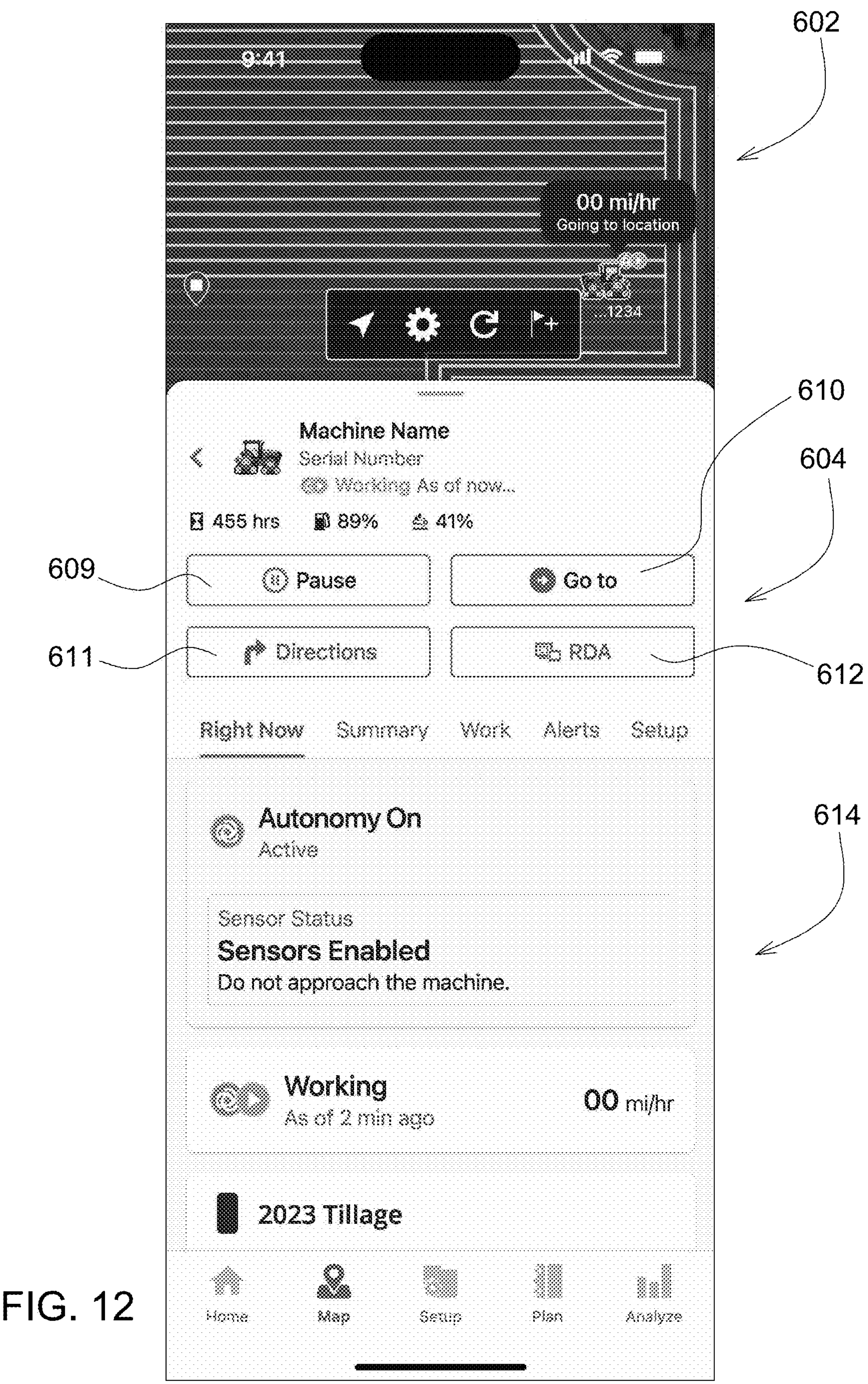
FIG. 12 illustrates a seventh example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 12 illustrates a seventh example of a screen (e.g., with relative position of vehicle 102 along a path plan in a field map portion 602, (autonomy) status indicators and control, and go-to control buttons) on a user interface or remote user interface 144 for a vehicle 102, such as an autonomous, semi-autonomous vehicle or remote controlled vehicle. The exemplary screen of FIG. 12 is similarly to the screen of FIG. 6, except the screen of FIG. 12 has activated the pause button 609 or stop button to stop the motion of vehicle 102 (e.g., autonomous or semi-autonomous vehicle). Like references in FIG. 6 and FIG. 12 indicate like features, elements and processes.

Figure 13:
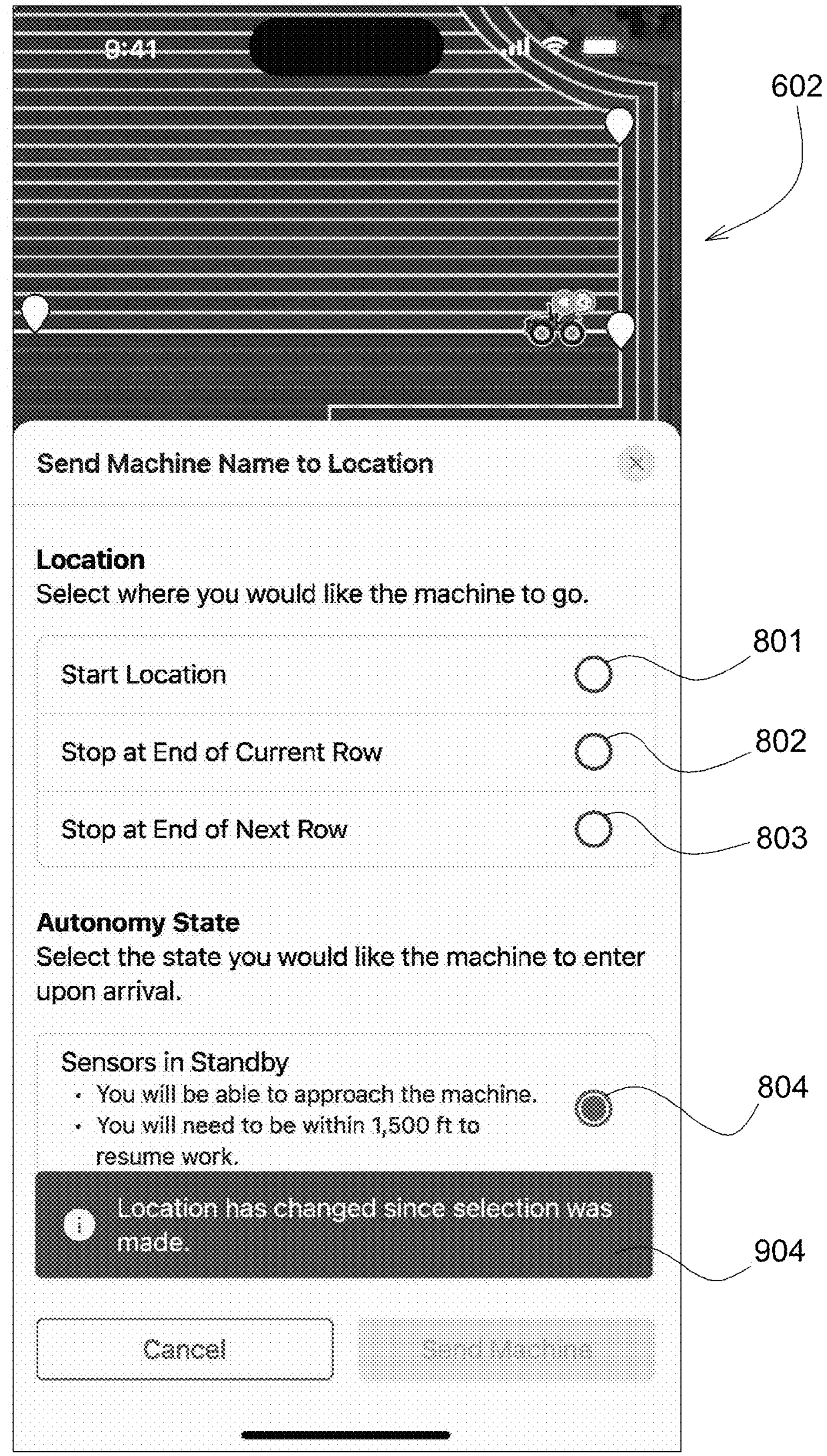
FIG. 13 illustrates a eighth example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 13 illustrates an eighth example of a screen (e.g., with relative position of vehicle 102 along a path plan in a field map portion, (autonomy) status indicators and control, and go-to control buttons) on a user interface or remote user interface 144 for a vehicle 102, such as an autonomous, semi-autonomous vehicle or remote controlled vehicle. The exemplary screen of FIG. 13 is similar to screen of FIG. 8, except in FIG. 13 the remote user interface 144 receives wireless an alert 904 that the destination tendering location has changed or that a different destination tendering location has been selected, such that the sensors are in standby mode needs to be reselected or entered after confirming the proper destination tendering location. Further, the remote user interface 144 may deselect all of the candidate destination tendering locations (e.g., buttons 801, 802, 803) to prompt or trigger the operator to confirm, select or reselect the appropriate destination tendering location first and then confirm the corresponding proper sensors in sensor standby mode or not thereafter, by viewing the sensor in standby mode button 804. Like reference numbers in FIG. 13 and FIG. 8 indicate like elements, features or processes.

Figure 14:
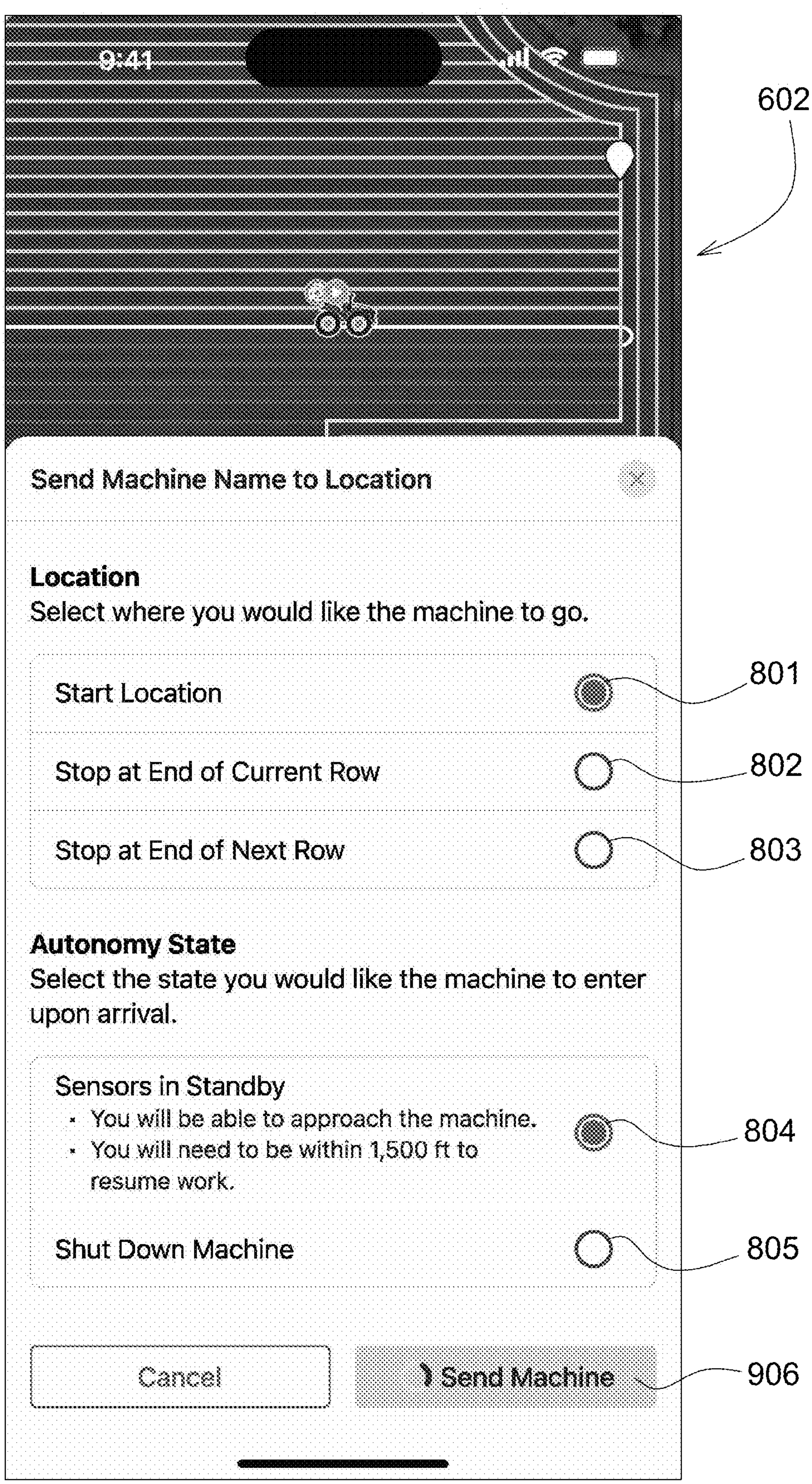
FIG. 14 illustrates a ninth example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 14 illustrates a ninth example of a screen (e.g., with relative position of vehicle 102 along a path plan in a field map portion, (autonomy) status indicators and control, and go-to control buttons) on a user interface or remote user interface 144 for a vehicle 102, such as an autonomous, semi-autonomous vehicle 102 or remote controlled vehicle 102. The exemplary screen of FIG. 14 is similar to the screen of FIG. 9, except the screen of FIG. 14 indicates at send machine button 906 that the sending of vehicle 102 (e.g., machine) is in-process (e.g., by the annular icon, which may have a moving rotating arc within the annular icon), such as determining or estimating a suitable path plan to reach the selected start location as the destination tendering location. Like reference numbers in FIG. 14 and FIG. 9 indicate like elements, features or processes.

Figure 15:
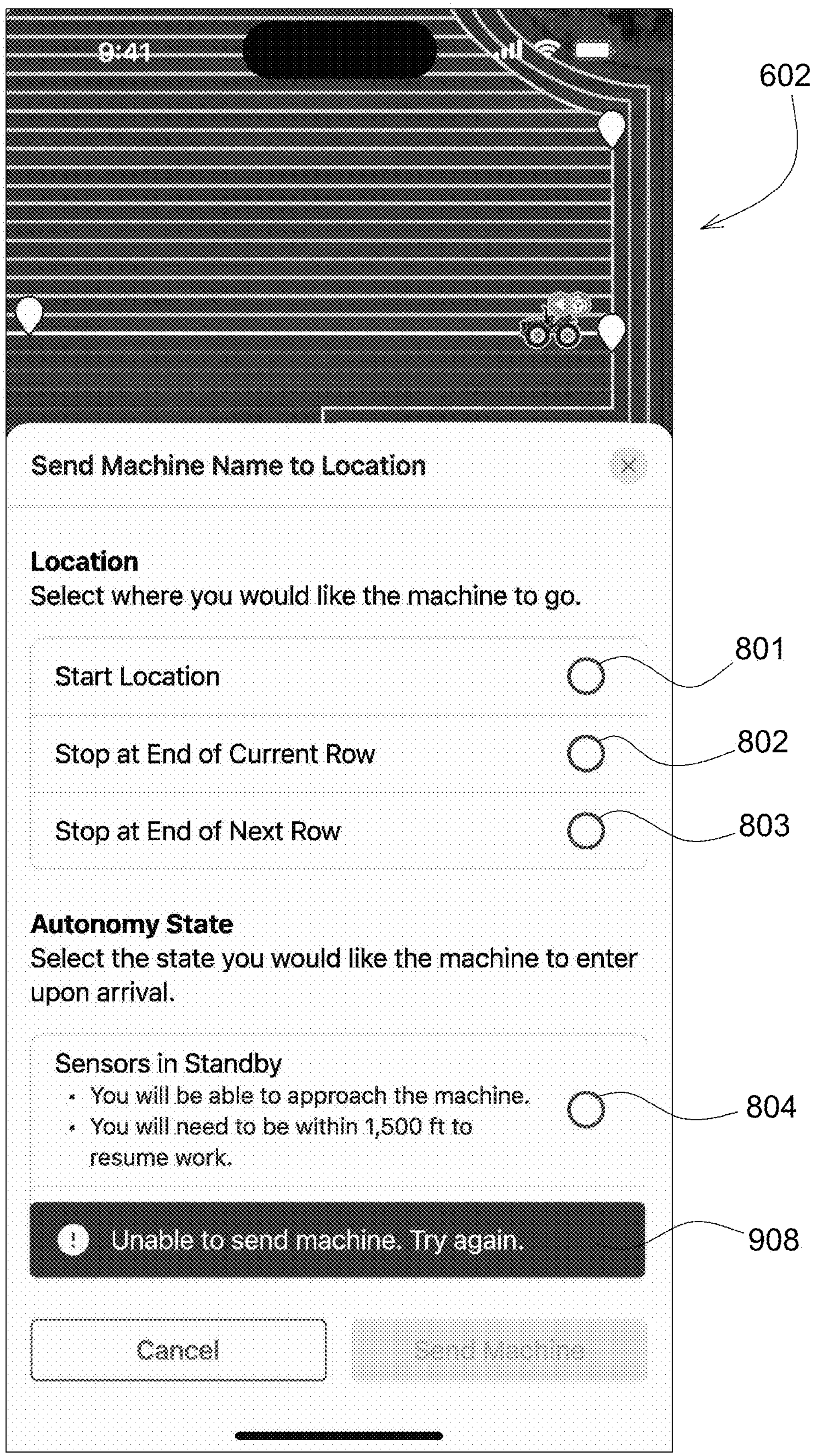
FIG. 15 illustrates a tenth example of a screen (e.g., with relative position of vehicle along a path plan in a field map portion, (autonomy) status indicators and control, and go-to control buttons) on a user interface or remote user interface for a vehicle, such as an autonomous, semi-autonomous vehicle or remote controlled vehicle.

FIG. 15 illustrates a tenth embodiment of a screen (e.g., with relative position of vehicle 102) along a path plan in a field map portion, (autonomy) status indicators and control, and go-to control buttons) on a user interface or remote user interface 144 for a vehicle 102, such as an autonomous, semi-autonomous vehicle or remote controlled vehicle. The exemplary screen of FIG. 15 is similar to the screen of FIG. 9, except the screen of FIG. 15 has an alert 908 that indicates that the remote user interface 144 is unable to send the vehicle 102 the destination tendering location: (a) that has not been selected, or (b) for which there is no suitable path to reach the selected start location as the destination tendering location, or (c) for which other issues prevent sending the vehicle 102 (e.g., machine), such as a diagnostic trouble code or error message.

Having described one or more preferred embodiments, it will become apparent that various modifications can be made without departing from the scope of the invention as defined in the accompanying claims.

The following is claimed:

1. A method for controlling a path plan of a vehicle, the method comprising:

operating the vehicle in a normal mode along a current row of a path of the vehicle, the vehicle having a first pose that includes a heading angle or yaw angle;

determining that the vehicle requires tendering or service based on output from one or more sensors, the one or more sensors including a fuel sensor indicating that a fuel level of the vehicle is below a lower threshold fuel level or a battery state of charge sensor indicating that a state of charge of a battery is below a lower threshold charge level;

sending wirelessly an alert message to an end user to confirm that the end user seeks to select a destination tendering location, the end user supervising the vehicle contemporaneous with the sending wirelessly the alert message;

sending wirelessly a defined list of candidate destination tendering locations for the end user to select and to activate a tendering mode;

recording or storing first information in a data storage device in response to the end user activating the tendering mode, the first information including a saved first position and a corresponding saved first pose of the vehicle, a saved first implement state and saved first implement settings for resumption of the normal mode after tendering; and causing a steering actuator to change an angle of a wheel of the vehicle to direct the vehicle toward a selected destination tendering location in response to the end user activating the tendering mode.

2. The method according to claim 1, wherein:

determining that the tendering or the service is completed during the tendering mode based on, the fuel sensor indicating that the fuel level of the vehicle is above an upper threshold fuel level, or the battery state of charge sensor indicating that the state of charge of the battery exceeds an upper threshold charge level.

3. The method according to claim 2, further comprising:

directing or navigating the vehicle in a resumption mode to the saved first position and the corresponding saved first pose, the saved first implement state and the saved first implement settings in response to determining that the tendering or the service are completed.

4. The method according to claim 1, wherein the sending wirelessly the defined list of candidate destination tendering locations causes the defined list of candidate destination tendering locations to be presented to the end user on a user interface as a list of selectable radio buttons for corresponding candidate selections.

5. The method according to claim 1, wherein:

the sending wirelessly the defined list of candidate destination tendering locations includes defining each among the list of candidate destination tendering locations as, a start location or entry point of the vehicle onto a work site or a field, an end of the current row of the path of the vehicle that is traversing the path plan, the path plan including a series of parallel rows that are connected by end turns, or an end of a next row of the path of the vehicle after the vehicle traverses an end of the current row, completes an end turn and begins to traverse the next row.

6. The method according to claim 5, wherein the sending wirelessly the defined list of candidate destination tendering locations causes the defined list of candidate destination tendering locations to be presented to the end user on a user interface as a list of selectable radio buttons for corresponding candidate selections.

7. The method according to claim 1, further comprising:

automatically raising and turning off an implement in the tendering mode as the vehicle leaves a boundary of a field or worksite, upon entry into a headland, or upon reaching a start location or entry point of the vehicle on the field or work-site.

8. The method according to claim 1, further comprising:

directing or navigating the vehicle in a resumption mode in which a return path of the vehicle from the selected destination tendering location to the saved first position, the directing or navigating the vehicle in the resumption mode causing the vehicle to return to the saved first position in accordance with the corresponding saved first pose including directing the vehicle to complete one or more pose-adjusting or pose-compensating maneuvers.

9. The method according to claim 8, wherein the one or more pose-adjusting or pose-compensating maneuvers include a first turn of approximately 180 degrees in a headland of a field followed by traversing an adjacent or row skipping path and an end-field turn to return to a row that intercepts the saved first position that conforms to the corresponding saved first pose.

10. The method according to claim 1, wherein the corresponding saved first pose includes at least one of:

a first heading angle of the vehicle, a first yaw angle of the vehicle, or a first attitude of the vehicle.

11. The method according to claim 1, wherein the first information includes a first implement position.

12. The method according to claim 1, wherein the first information includes a first implement pose, the first implement pose including at least one of, a first heading angle of an implement, a first yaw angle of the implement, or a first attitude of the implement.

13. The method according to claim 1, wherein the first information includes a first steering angle of the vehicle.

14. The method according to claim 1, wherein the first information includes a first steering angle of an implement.

15. The method according to claim 10, wherein the first information includes a first implement position.

16. The method according to claim 10, wherein the first information includes a first implement pose, the first implement pose including at least one of, a first heading angle of an implement, a first yaw angle of the implement, or a first attitude of the implement.

17. The method according to claim 10, wherein the first information includes a first steering angle of the vehicle.

18. The method according to claim 10, wherein the first information includes a first steering angle of an implement.

19. The method according to claim 15, wherein the first information includes a first implement pose, the first implement pose including at least one of, a first heading angle of an implement, a first yaw angle of the implement, or a first attitude of the implement.

20. The method according to claim 15, wherein the first information includes a first steering angle of the vehicle.

* * * * *